United States Patent
Kim et al.

(10) Patent No.: US 10,812,117 B2
(45) Date of Patent: Oct. 20, 2020

(54) ELECTRONIC DEVICE AND IMPEDANCE MATCHING METHOD FOR ANTENNA THEREOF

(71) Applicant: Samsung Electronics Co., Ltd., Gyeonggi-do (KR)

(72) Inventors: Sanguk Kim, Gyeonggi-do (KR); Sangsoon Kim, Gyeonggi-do (KR); Taekho Lee, Seoul (KR); Hyoseok Na, Gyeonggi-do (KR)

(73) Assignee: Samsung Electronics Co., Ltd, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/491,667

(22) PCT Filed: Mar. 5, 2018

(86) PCT No.: PCT/KR2018/002585
§ 371 (c)(1),
(2) Date: Sep. 6, 2019

(87) PCT Pub. No.: WO2018/164432
PCT Pub. Date: Sep. 13, 2018

(65) Prior Publication Data
US 2020/0036400 A1 Jan. 30, 2020

(30) Foreign Application Priority Data
Mar. 7, 2017 (KR) .................. 10-2017-0029002

(51) Int. Cl.
*H04B 17/12* (2015.01)
*H01Q 5/335* (2015.01)
(Continued)

(52) U.S. Cl.
CPC ............ *H04B 1/006* (2013.01); *H01Q 1/243* (2013.01); *H04B 1/401* (2013.01)

(58) Field of Classification Search
CPC .......... H04B 1/006; H04B 1/401; H04B 1/00; H04B 17/12; H04B 1/0458; H01Q 1/243; H01Q 5/335
See application file for complete search history.

(56) References Cited

U.S. PATENT DOCUMENTS

| | | | | |
|---|---|---|---|---|
| 6,026,280 A | * | 2/2000 | Yokomura | H04B 1/18 455/121 |
| 6,735,418 B1 | * | 5/2004 | MacNally | H04B 1/0458 455/78 |

(Continued)

FOREIGN PATENT DOCUMENTS

| KR | 10-2004-0092127 A | 11/2004 |
|---|---|---|
| KR | 10-2013-0135646 A | 12/2013 |

(Continued)

*Primary Examiner* — Andrew Wendell
(74) *Attorney, Agent, or Firm* — Cha & Reiter, LLC.

(57) ABSTRACT

Various embodiments of the present invention relate to an electronic device including an antenna impedance matching circuit. The electronic device may comprise: at least one interface; at least one detection circuit for detecting a connection of at least one external device to the at least one interface; at least two matching circuits; an antenna; and a switch module for receiving, from the at least one detection circuit, at least one signal corresponding to whether the at least one external device is connected to the at least one interface, and for connecting the antenna to a matching circuit, among the at least two matching circuits, corresponding to the at least one signal. Various other embodiments are also possible.

17 Claims, 11 Drawing Sheets

(51) Int. Cl.
    *H04B 1/00*         (2006.01)
    *H01Q 1/24*        (2006.01)
    *H04B 1/401*      (2015.01)

(56) References Cited

U.S. PATENT DOCUMENTS

| | | | | |
|---|---|---|---|---|
| 2008/0222341 | A1* | 9/2008 | Lin | G06F 13/426 |
| | | | | 710/316 |
| 2012/0319918 | A1* | 12/2012 | Ramachandran | H01Q 9/0442 |
| | | | | 343/852 |
| 2013/0016447 | A1* | 1/2013 | Kitabata | H03F 1/52 |
| | | | | 361/56 |
| 2013/0063076 | A1* | 3/2013 | Shen | H02J 7/32 |
| | | | | 320/107 |
| 2013/0181663 | A1* | 7/2013 | Jung | H02J 7/045 |
| | | | | 320/107 |
| 2013/0308476 | A1 | 11/2013 | He et al. | |
| 2014/0085160 | A1* | 3/2014 | Valkonen | H01Q 5/35 |
| | | | | 343/860 |
| 2014/0170990 | A1* | 6/2014 | Black | H04B 1/401 |
| | | | | 455/73 |
| 2015/0054701 | A1 | 2/2015 | Kim et al. | |
| 2016/0028157 | A1 | 1/2016 | Kim et al. | |
| 2017/0288736 | A1* | 10/2017 | Zhou | H01Q 1/2225 |

FOREIGN PATENT DOCUMENTS

| | | |
|---|---|---|
| KR | 10-2014-0062856 A | 5/2014 |
| KR | 10-2015-0027682 A | 3/2015 |
| KR | 10-2016-0012571 A | 2/2016 |

\* cited by examiner

ELECTRONIC DEVICE AND IMPEDANCE MATCHING METHOD FOR ANTENNA THEREOF

CLAIM OF PRIORITY

This application is a National Phase Entry of PCT International Application No. PCT/KR2018/002585, which was filed on Mar. 5, 2018, and claims a priority to Korean Patent Application No. 10-2017-0029002, which was filed on Mar. 7, 2017, the contents of which are incorporated herein by reference.

TECHNICAL FIELD

The disclosure relates to an electronic device and an impedance-matching method of an antenna thereof.

BACKGROUND ART

Electronic devices (for example, mobile terminals, smartphones, and wearable electronic devices) may provide various functions. For example, smartphones may provide not only a basic voice call function but also wireless communication (for example, short-range wireless communication (Bluetooth, Wi-Fi, or Near Field Communication (NFC)), Bluetooth Low Energy (BLE), mobile communication (3G, 4G, or 5G)), a music or video reproduction function, a photography function, a navigation function, and a messenger function.

The electronic devices may include an antenna to provide a wireless communication function. The antenna may be generally designed to have one or more resonant frequencies. A matching circuit (an impedance-matching circuit) for impedance matching may be located between the antenna and a wireless communication module.

DISCLOSURE OF INVENTION

Technical Problem

The characteristics of an antenna of the electronic device may vary depending on various conditions. For example, impedance matching or a resonant frequency of the antenna may be changed by external factors (for example, connection with an external device). In other words, the characteristics of the antenna may be changed when the electronic device is connected to an external device, and thus radiation performance may deteriorate.

Various embodiments of the disclosure to solve the above problems may provide an electronic device capable of compensating for a change in the characteristics of an antenna due to external factors and an impedance-matching method of the antenna.

Various embodiments of the disclosure may provide an electronic device capable of appropriately switching a matching circuit connected to an antenna when the electronic device is connected to an external device through a physical device (for example, a hardware circuit) and an impedance-matching method of the antenna.

Solution to Problem

In accordance with an aspect of the disclosure, an electronic device is provided. The electronic device includes: at least one interface; at least one detection circuit configured to detect a connection between each of at least one external device and the at least one interface; at least two matching circuits; an antenna; and a switch module configured to receive at least one signal corresponding to the connection or non-connection between the at least one external device and the at least one interface from the at least one detection circuit and connect the antenna with a matching circuit corresponding to the at least one signal among the at least two matching circuits.

In accordance with an aspect of the disclosure, an electronic device is provided. The electronic device includes: at least one interface; at least one detection circuit configured to detect each of at least one external device connected to the at least one interface; a communication module; at least two antennas; and a switch module configured to receive at least one signal corresponding to a connection or non-connection between the at least one external device and the at least one interface from the at least one detection circuit and connect the communication module with an antenna corresponding to the at least one signal among the at least two antennas.

In accordance with an aspect of the disclosure, a method of matching impedance of an antenna by an electronic device is provided. The method includes: detecting, by at least one detection circuit, a connection between each of at least one external device and the at least one interface; and performing, by a switch module, switching to connect the antenna with a matching circuit corresponding to the at least one connected external device among at least two matching circuits in response to the detection of the connection of the at least one external device.

Advantageous Effects of Invention

According to various embodiments of the disclosure, it is possible to connect an antenna with an appropriate matching circuit through a physical device (for example, a hardware circuit) without applying a separate algorithm (for example, software) for controlling impedance matching of the antenna. The disclosure makes it possible to prevent a malfunction due to a software error according to the use of an independent hardware circuit that does not depend on software.

Further, various embodiments can process a greater variety of situations (a greater number of different cases) by combining physical devices with existing algorithms. Accordingly, various embodiments of the disclosure are capable of preventing algorithms from being complicated due to the requirement to process various situations. In other words, various embodiments of the disclosure are capable of preventing a software error from occurring due to simplification of such an algorithm.

BEST MODE FOR CARRYING OUT THE INVENTION

Figure 1:
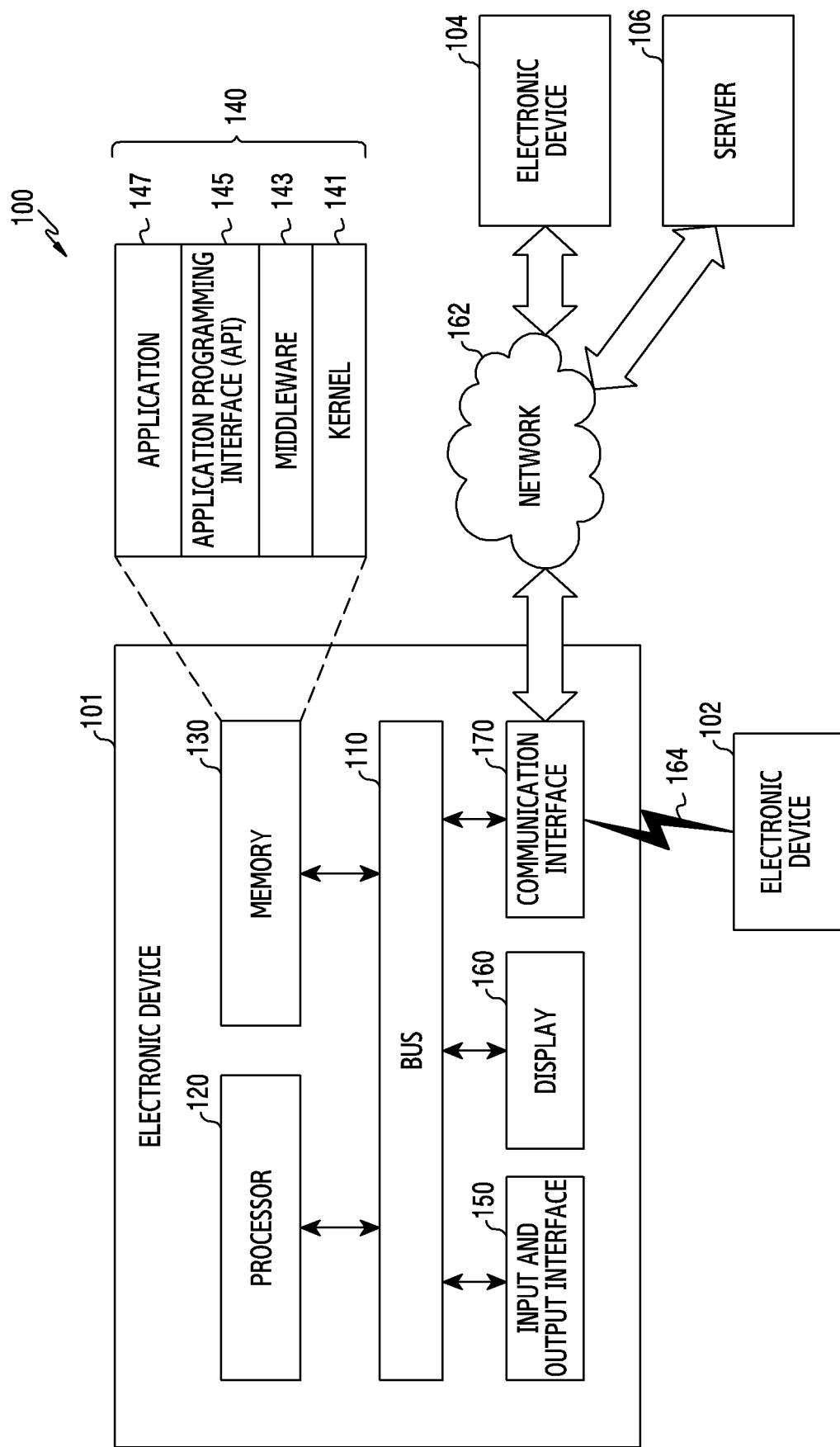
FIG. 1 illustrates a network environment including an electronic device according to various embodiments of the disclosure.

Hereinafter, various embodiments of the present disclosure will be described with reference to the accompanying drawings. Various embodiments and terms used herein do not limit various embodiments of the present disclosure to the particular forms, and should be understood to include various modifications, equivalents, and/or alternatives of the corresponding embodiments. In the description of the drawings, identical or similar reference numerals are used to designate identical or similar elements. It is to be understood that the singular forms may include plural referents unless the context clearly dictates otherwise. In the present disclosure, an expression such as "A or B," or "at least one of A and B" may include all possible combinations of the listed items. Expressions such as "first," "second," "primarily," or "secondary," as used herein, may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through another element (such as a third element).

An expression "configured to (or set)" used in the present disclosure may be used interchangeably with, for example, "suitable for," "having the capacity to," "designed to," "adapted to," "made to," or "capable of" according to a situation. A term "configured to (or set)" does not only mean "specifically designed to" by hardware. Alternatively, in some situations, the expression "apparatus configured to" may mean that the apparatus "can" operate together with another apparatus or component. For example, a phrase "a processor configured (or set) to perform A, B, and C" may be at a dedicated processor (such as an embedded processor) for performing a corresponding operation or a generic-purpose processor (such as a Central Processing Unit (CPU) or an application processor) that can perform a corresponding operation by executing at least one software program stored at a memory device.

An electronic device according to embodiments of the present disclosure, may be embodied as, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG 3 (MP3) player, a medical equipment, a camera, and a wearable device. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit. The electronic device may be embodied as at least one of, for example, a television, a Digital Versatile Disc (DVD) player, an audio device, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™, an electronic dictionary, an electronic key, a camcorder, and an electronic frame.

In another embodiment, the electronic device may be embodied as at least one of various medical devices (such as, various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data Recorder (FDR), a vehicle infotainment device, electronic equipment for ship (such as, a navigation device for ship and gyro compass), avionics, a security device, a head unit for a vehicle, an industrial or home robot, a drone, an Automated Teller Machine (ATM) of a financial institution, a Point Of Sales (POS) device of a store, and an Internet of Things (IoT) device (e.g., a light bulb, various sensors, a sprinkler device, a fire alarm, a thermostat, a street light, a toaster, sports equipment, a hot water tank, a heater, and a boiler). According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device). An electronic device, according to an embodiment, can be a flexible electronic device or a combination of two or more of the foregoing various devices. An electronic device, according to an embodiment of the present disclosure, is not limited to the foregoing devices may be embodied as a newly developed electronic device. The term "user", as used herein, can refer to a person using an electronic device or a device using an electronic device (e.g., an artificial intelligence electronic device).

FIG. 1 illustrates a network environment including an electronic device according to various embodiments of the disclosure.

Referring to FIG. 1, an electronic device 101 resides in a network environment 100. The electronic device 101 can include a bus 110, a processor 120, a memory 130, an input/output interface 150, a display 160, and a communication interface 170. The electronic device 101 may be provided without at least one of the components, or may include at least one additional component. The bus 110 can include a circuit for connecting the components 120 through 170 and delivering communication signals (e.g., control messages or data) therebetween. The processor 120 can include one or more of a CPU, an application processor, and a Communication Processor (CP). The processor 120, for example, can perform an operation or data processing with respect to control and/or communication of at least another component of the electronic device 101.

The memory 130 can include a volatile and/or nonvolatile memory. The memory 130, for example, can store commands or data relating to at least another component of the electronic device 101. According to an embodiment, the memory 130 can store software and/or a program 140. The program 140 can include, for example, a kernel 141, middleware 143, an Application Programming Interface (API) 145, and/or an application program (or "application") 147. At least part of the kernel 141, the middleware 143, or the API 145 can be referred to as an Operating System (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control. The input/output interface 150, for example, can deliver commands or data inputted from a user or another external device to other component(s) of the electronic device 101, or output commands or data inputted from the other component(s) of the electronic device 101 to the user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part. The communication interface 170, for example, can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over a network 162 through wireless communication or wired communication.

The wireless communication, for example, can include cellular communication using at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). The wireless communication can include, for example, at least one of Wireless Fidelity (WiFi), Bluetooth, Bluetooth Low Energy (BLE), Zigbee, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLO-NASS), Beidou navigation satellite system (Beidou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include a telecommunications network, for example, at least one of computer network (e.g., LAN or WAN), Internet, and telephone network.

Each of the first and second external electronic devices 102 and 104 can be of the same as or of a different type from that of the electronic device 101. According to embodiments of the present disclosure, all or part of operations executed in the electronic device 101 can be executed by another electronic device or a plurality of electronic devices (e.g., the electronic device 102 or 104, or the server 106). To perform a function or service automatically or by request, instead of performing the function or the service by the electronic device 101, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and send its result to the electronic device 101. The electronic device 101 can provide the requested function or service by processing the received result. In doing so, for example, cloud computing, distributed computing, or client-server computing techniques can be used.

Figure 2:
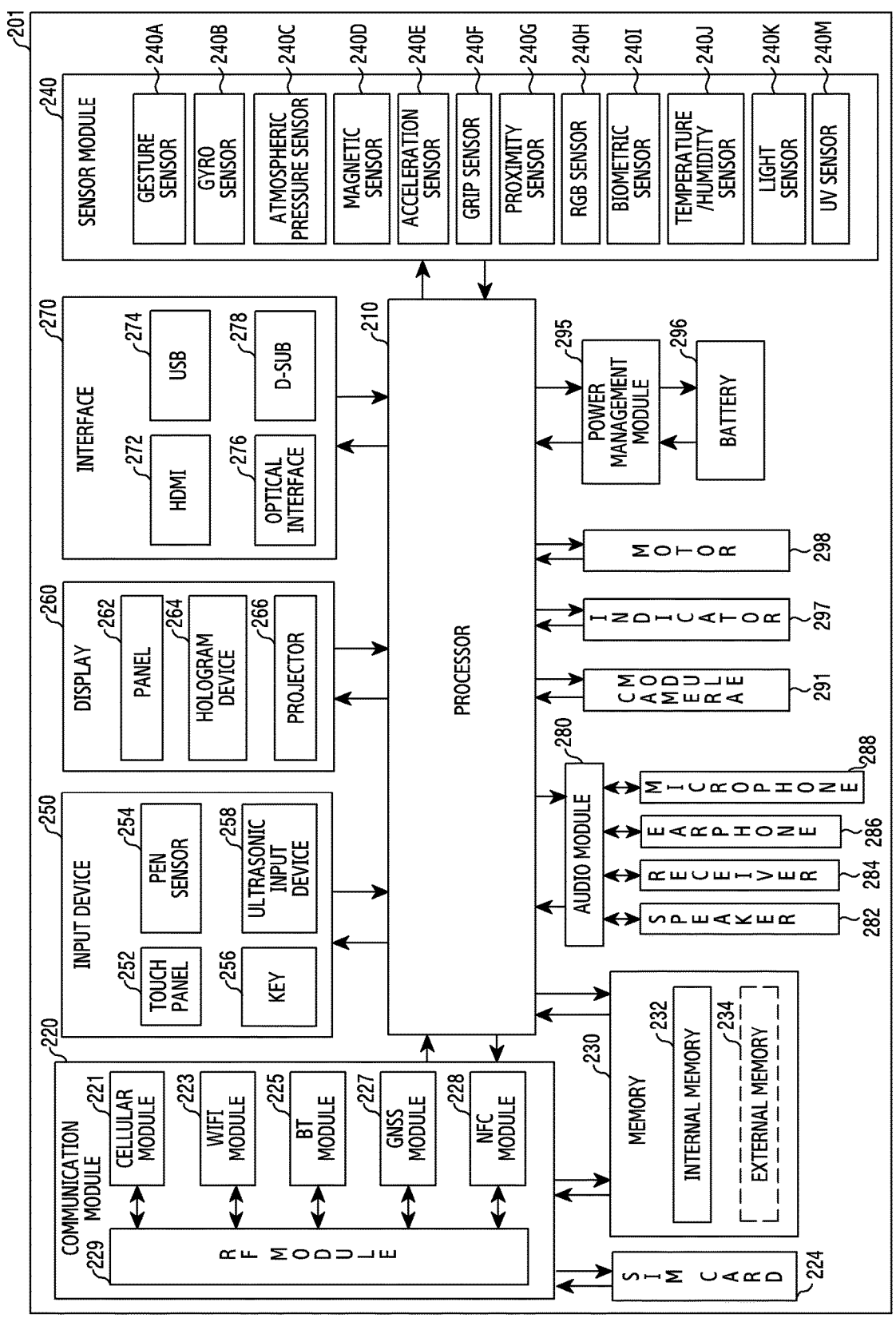
FIG. 2 is a block diagram of an electronic device according to various embodiments.

FIG. 2 is a block diagram of an electronic device 201 according to an embodiment of the present disclosure. The electronic device 201, for example, can include all or part of the above-described electronic device 101 of FIG. 1. The electronic device 201 includes one or more processors (e.g., an AP) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. The processor 210, for example, can control a plurality of hardware or software components connected to the processor 210, and also can perform various data processing and operations by executing an OS or an application program. The processor 210 can be implemented with a System on Chip (SoC), for example. The processor 210 can further include a Graphic Processing Unit (GPU) and/or an image signal processor. The processor 210 may include at least part (e.g., a cellular module 221) of the components shown in FIG. 2. The processor 210 can load commands or data received from at least one other component (e.g., a nonvolatile memory) into a volatile memory, process them, and store various data in the nonvolatile memory.

The communication module 220 can have the same or similar configuration to the communication interface 170 of FIG. 1. The communication module 220 can include, for example, the cellular module 221, a WiFi module 223, a Bluetooth (BT) module 225, a GNSS module 227, an NFC module 228, and an RF module 229. The cellular module 221, for example, can provide voice call, video call, Short Message Service (SMS), or Internet service through a communication network. The cellular module 221 can identify and authenticate the electronic device 201 in a communication network by using the SIM (e.g., a SIM card) 224. The cellular module 221 can perform at least part of a function that the processor 210 provides. The cellular module 221 can further include a CP. At least some (e.g., two or more) of the cellular module 221, the WiFi module 223, the BT module 225, the GNSS module 227, and the NFC module 228 can be included in one Integrated Circuit (IC) or an IC package. The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another embodiment, at least one of the cellular module 221, the WiFi module 223, the BT module 225, the GNSS module 227, and the NFC module 228 can transmit/receive an RF signal through an additional RF module. The SIM 224, for example, can include a card including a SIM or an embedded SIM, and also can contain unique identification information (e.g., an Integrated Circuit Card Identifier (ICCID)) or subscriber information (e.g., an International Mobile Subscriber Identity (IMSI)).

The memory 230 (e.g., the memory 130) can include at least one of an internal memory 232 and an external memory 234. The internal memory 232 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), Multi-Media Card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, and an Ultra Violet (UV) sensor 240M. Additionally or alternatively, the sensor module 240 can include an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 can include at least one of a touch panel 252, a (digital) pen sensor 254, a key 256, and an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone 288 and check data corresponding to the detected ultrasonic waves.

The display 260 (e.g., the display 160) can include at least one of a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252. The hologram device 264 can show three-dimensional images in the air by using the interference of light. The projector 266 can display an image by projecting light on a screen. The screen, for example, can be placed inside or outside the electronic device 201. The interface 270 can include, for example, an HDMI 272, a USB 274, an optical interface 276, or a D-subminiature (D-sub) 278. The interface 270 can be included in, for example, the communication interface 170 of FIG. 1. Additionally or alternately, the interface 270 can include a Mobile High-Definition Link (MHL) interface, a SD card/MMC interface, or an Infrared Data Association (IrDA) standard interface.

The audio module 280, for example, can convert sounds into electrical signals and convert electrical signals into sounds. At least some components of the audio module 280 can be included in, for example, the input/output interface 150 of FIG. 1. The audio module 280 can process sound information inputted or outputted through a speaker 282, a receiver 284, an earphone 286, or the microphone 288. The camera module 291, as a device for capturing still images and videos, can include one or more image sensors (e.g., a front sensor or a rear sensor), a lens, an Image Signal Processor (ISP), or a flash (e.g., an LED or a xenon lamp). The power management module 295, for example, can manage the power of the electronic device 201. According to an embodiment of the present disclosure, the power management module 295 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB), Digital Video Broadcasting (DVB), or MediaFLOW™. Each of the above-described components of the electronic device can be configured with at least one component and the name of a corresponding component can vary according to the kind of an electronic device. According to an embodiment of the present disclosure, an electronic device (e.g., the electronic device 201) can be configured to include at least one of the above-described components or an additional component, or to not include some of the above-described components. Additionally, some of components in an electronic device are configured as one entity, so that functions of previous corresponding components are performed identically.

Figure 3:
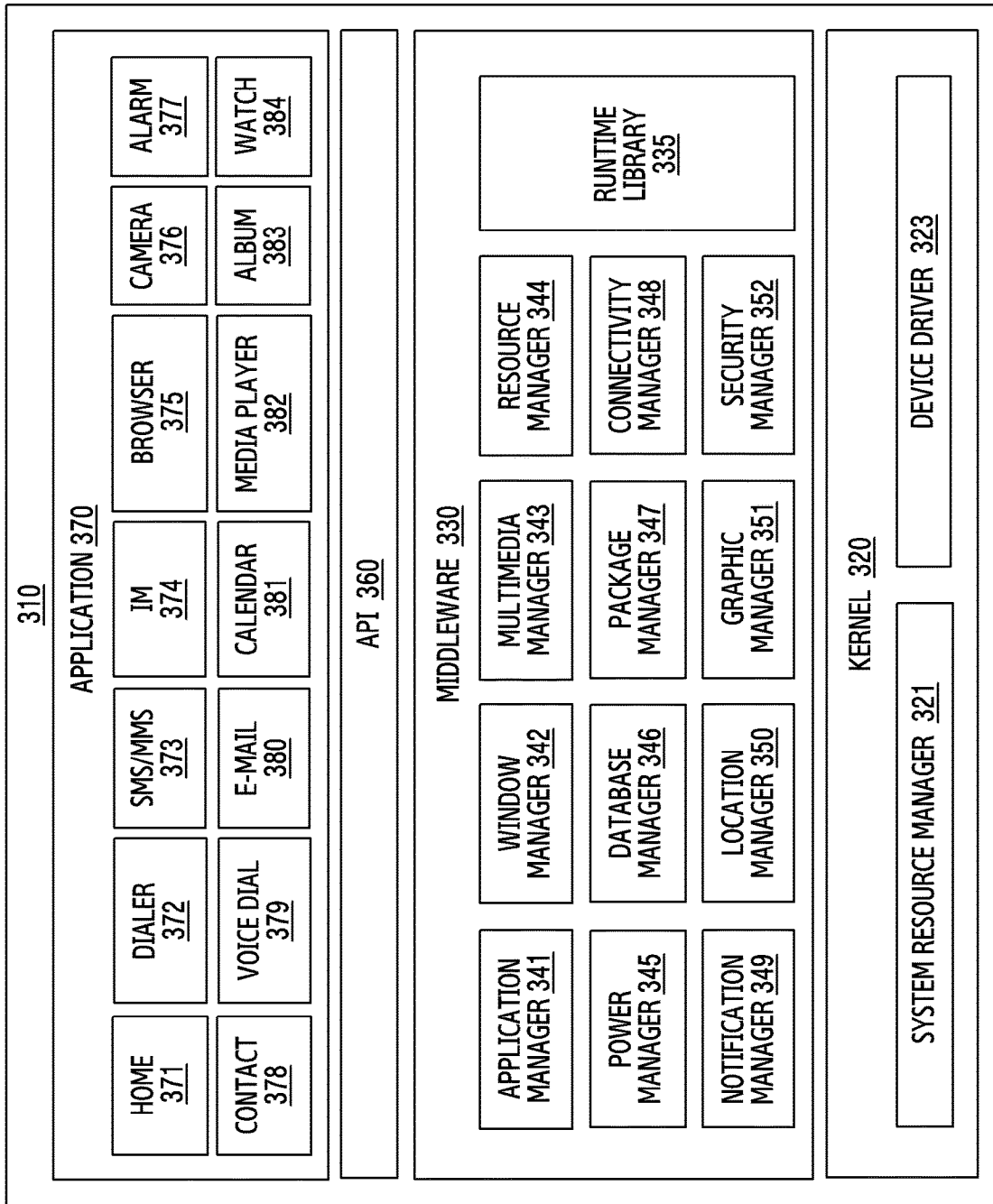
FIG. 3 is a block diagram of a program module according to various embodiments.

FIG. 3 is a block diagram of a program module according to an embodiment of the present disclosure. A program module 310 (e.g., the program 140) can include an OS for controlling a resource relating to an electronic device (e.g., the electronic device 101) and/or various applications (e.g., the application program 147) running on the OS. The OS can include, for example, Android™, iOS™, Windows™, Symbian™, Tizen™, or Bada™. Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least part of the program module 310 can be preloaded on an electronic device or can be downloaded from an external electronic device (e.g., the electronic device 102, 104, or the server 106).

The kernel 320 includes, for example, at least one of a system resource manager 321 and/or a device driver 323. The system resource manager 321 can control, allocate, or retrieve a system resource. According to an embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a WiFi driver, an audio driver, or an Inter-Process Communication (IPC) driver. The middleware 330, for example, can provide a function commonly required by the application 370, or can provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a complier to add a new function through a programming language while the application 370 is running. The runtime library 335 can manage input/output, manage memory, or arithmetic function processing. The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 3740 or a memory space. The power manager 345 can manage the capacity or power of the battery and provide power information for an operation of the electronic device. The power manager 345 can operate together with a Basic Input/Output System (BIOS). The database manager 346 can create, search, or modify a database used in the application 370. The package manager 347 can manage installation or updating of an application distributed in a package file format.

The connectivity manger 348 can manage, for example, a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide, for example, system security or user authentication. The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components. The API 360, as a set of API programming functions, can be provided as another configuration according to the OS. For example, Android or iSO can provide one API set for each platform, and Tizen can provide two or more API sets for each platform.

The application 370 can include at least one of a home 371, a dialer 372, an SMS/Multimedia Messaging System (MMS) 373, an Instant Message (IM) 374, a browser 375, a camera 376, an alarm 377, a contact 378, a voice dial 379, an e-mail 380, a calendar 381, a media player 382, an album 383, a clock 384, health care (e.g., measure an exercise amount or blood sugar level), or environmental information (e.g., air pressure, humidity, or temperature information) provision application. The application 370 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

Figure 4:
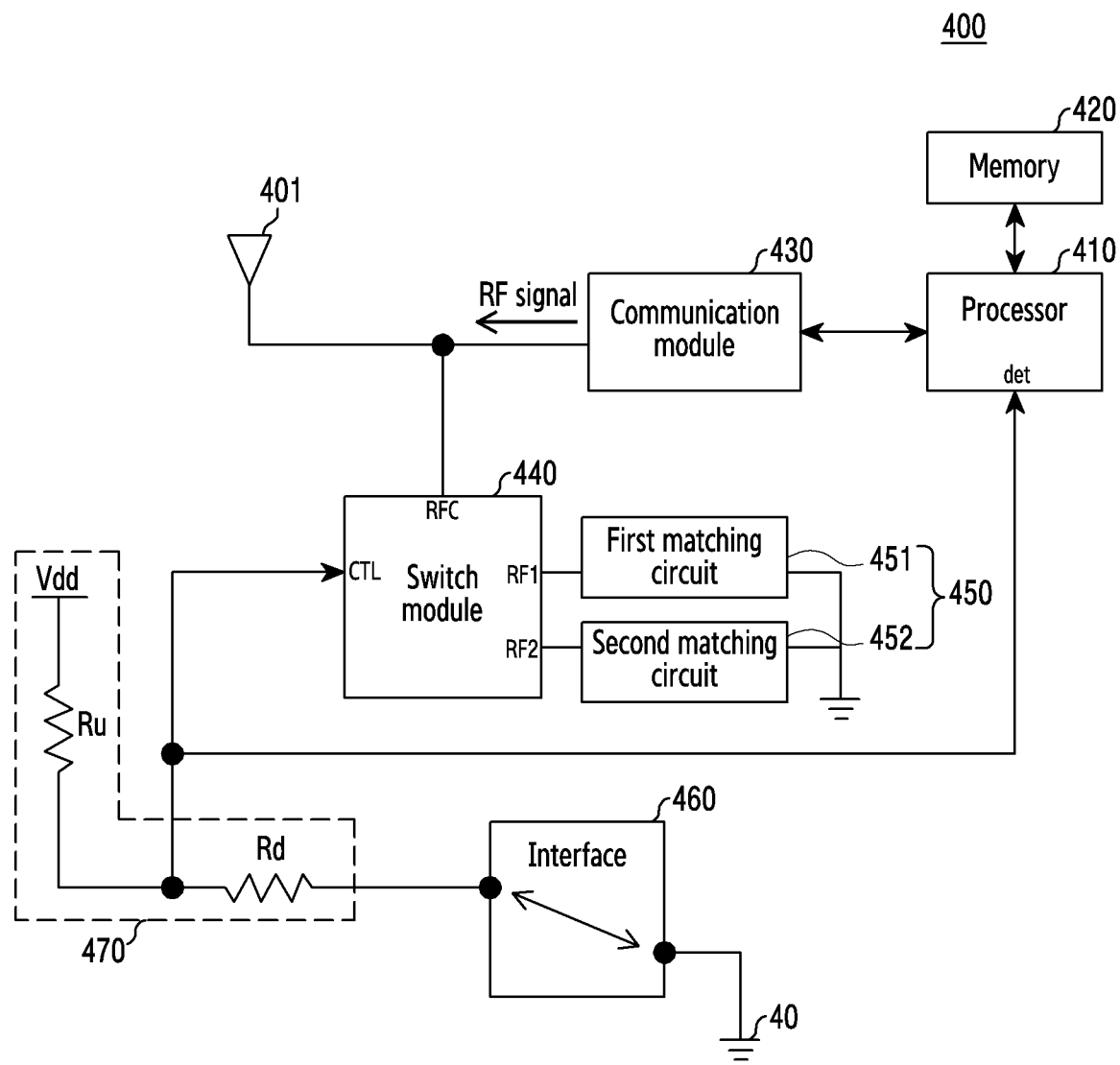
FIG. 4 illustrates the configuration of an electronic device according to an embodiment of the disclosure.

FIG. 4 illustrates the configuration of an electronic device according to an embodiment of the disclosure.

Referring to FIG. 4, an electronic device 400 according to an embodiment of the disclosure may include, for example, all or some of the electronic device 101 illustrated in FIG. 1 or the electronic device 201 illustrated in FIG. 2.

The electronic device 400 may include an antenna 401, a processor 410, a memory 420, a communication module 430, a switch module 440, a matching circuit module 450, an interface 460, and a detection circuit 470.

The processor 410 (for example, the processor 120 or the processor 210) may control the overall operation of the electronic device 400. For example, the processor 410 may control respective elements of the electronic device 400. The processor 410 may receive instructions from the memory 420 and control the respective elements according to the received instructions so as to perform various functions.

The processor 410 may be a Central Processing Unit (CPU), an Application Processor (AP), a Micro Controller Unit (MCU), or a Micro Processor Unit (MPU). The processor 410 may be configured as a single-core processor or a multi-core processor. According to another embodiment, the processor 410 may be a multi-processor including a plurality of processors. For example, the processor 410 may include an Application Processor (AP) and a Communication Processor (CP). According to another embodiment, the processor 410 may include a high-power processor (for example, an AP) and a low-power processor (for example, an MCU or an MPU).

The processor 410 may include a detection terminal (det) for recognizing connection of an external device (for example, earphones, a charger, or a Universal Series Bus (USB) device). For example, the processor 410 may recognize connection of an external device through a change in a voltage (or a current) input from the detection circuit 470. For example, when the voltage (or the current) input into the detection terminal (det) changes from a value larger than or equal to a predetermined value into a value smaller than the predetermined value, the processor 410 may recognize that the external device is connected. According to some embodiments, when the voltage (or the current) input into the detection terminal (det) changes from a value equal to or smaller than a predetermine value into a value larger than the predetermined value, the processor 410 may recognize that the external device is connected.

The memory 420 (for example, the memory 130 or the memory 230) may store various programs for operating the electronic device 400 and may also store data generated or downloaded while the various programs are executed. Further, the memory 420 may store various commands and/or instructions for operating the processor 410.

The communication module 430 (for example, the communication interface 170 or the communication module 220) may transmit and receive a radio signal through the antenna 401. For example, the communication module 430 may up-convert and amplify a baseband signal transmitted from the processor 410 into a radio signal and transmit the radio signal, and may low-noise amplify and down-convert the received radio signal and transmit the same to the processor 410. The communication module 430 may process a radio signal of various frequency bands for mobile communication (for example, GSM, CDMA, WCDMA, or LTE).

The antenna 401 may transmit and receive a radio signal. For example, the antenna 401 may be connected to the communication module 430 and may transmit and receive a radio signal in various frequency bands for mobile communication. The antenna 401 may be located on an upper part (a position at which a receiver is mounted), a lower part, a left part, and/or a right part of the electronic device 400. For example, the antenna 401 may be located adjacent to the interface 460. In this case, the connection of the external device may influence the characteristics of the antenna 401 (for example, an impedance change or a resonant frequency shift).

The antenna 401 according to an embodiment of the disclosure may be connected to another matching circuit through the switch module 440 on the basis of whether or not the external device is connected. For example, the antenna 401 may be connected to a first matching circuit 451 when the external device is not connected and may be connected to a second matching circuit 452 when the external device is connected.

The switch module 440 may be switched on the basis of whether or not the external device is connected. For example, the switch module 440 may be switched so as to be connected with another matching circuit depending on whether the antenna 401 is connected to the external device. The switch module 440 may be switched to connect the antenna 401 with the first matching circuit 451 when the external device is not connected and may be switched to connect the antenna 401 with the second matching circuit 452 when the external device is connected.

The switch module 440 according to an embodiment of the disclosure may be a Single-Pole Dual-Throw (SPDT)-type switch. The switch module 440 may include a control terminal (CTL), an input terminal (RFC), a first output terminal (RF1), and a second output terminal (RF2). The control terminal (CTL) may be connected to the detection circuit 470, the input terminal (RFC) may be connected to the antenna 401 and the communication module 430, the first output terminal (RF1) may be connected to the first matching circuit 451, and the second output terminal (RF2) may be connected to the second matching circuit 452.

The switch module 440 according to an embodiment of the disclosure may connect the input terminal (RFC) and the first output terminal (RF1) when a signal (high signal) having a predetermined value (for example, 0.5 V) or higher is input into the control terminal (CTL) (hereinafter, referred to as a default state), and may connect the input terminal (RFC) and the second output terminal (RF2) when a signal (low signal) having a value lower than the predetermined value (for example, 0.5 V) is input into the input terminal (RFC).

The matching circuit module 450 may include a plurality of matching circuits. For example, the matching circuit module 450 may include a first matching circuit 451 and a second matching circuit 452. The matching circuit module 450 according to an embodiment of the disclosure may prevent degradation (or deterioration) of radiation performance due to a change in the impedance of the antenna 401 when the external device is connected. For example, the first matching circuit 451 may be a circuit designed such that the antenna 401 has optimal radiation performance (for example, a resonant frequency of 800 MHz, a bandwidth of 50 MHz, and antenna efficiency of 30% or higher) while the external device is not connected, and the second matching circuit 452 may be a circuit designed such that the antenna 401 has optimal radiation performance (efficiency) while the external device is connected. The second matching circuit 452 may be a circuit for compensating for a change in the impedance of the antenna 401 and/or a shift in the resonant frequency thereof due to the connection of the external device.

The first matching circuit 451 and the second matching circuit 452 may be circuits in which at least one of a resistor, an inductor, and a capacitor is generally connected in series and/or in parallel. However, the disclosure is not limited thereto. For example, at least one of the first matching circuit 451 and the second matching circuit 452 may be a wire connected to the ground of the electronic device 400. In other words, according to an embodiment of the disclosure, it is possible to match the antenna and the impedance by controlling a length or a width of the wire connected to the ground of the electronic device 400. According to another embodiment, the first matching circuit 451 and the second matching circuit 452 may be circuits for changing a signal path of the antenna 401 (for example, for switching a plurality of feeding portions and/or a plurality of grounding portions) (refer FIGS. 9 and 10 below).

The interface 460 (for example, the input/output interface 150 or the interface 270) may be an interface device (for example, a connector) for connection with the external device (for example, earphones, a charger, or a USB device). For example, the interface 460 may be an earjack (for example, an audio interface) for connection (insertion) of 3-pole or 4-pole earphones, a charger, or a connector to which a USB device is connected (for example, a micro USB interface or a USB type-C interface). The interface 460 according to an embodiment of the disclosure may be installed at a location that may influence the performance of the antenna 401 (for example, a location that may cause a change in the impedance of the antenna 401 or a shift in a resonant frequency) when the external device is connected. For example, the interface 460 may be installed at a location (for example, a lower part) adjacent to the antenna 401.

The detection circuit 470 may be a circuit for detecting the connection with the external device through the interface 460. For example, a voltage (or current) value of the detection circuit 470 input into the switch module 440 and the processor 410 may be changed according to whether or not the external device is connected.

When the external device is not connected, the pull-down resistance (Rd) of the detection circuit 470 may be in an open state. In this case, the voltage (Vdd) may be input into the control terminal (CTL) of the switch module 440 and the detection terminal (det) of the processor 410.

Meanwhile, when the external device is connected, the pull-down resistance (Rd) of the detection circuit 470 may be connected to a ground terminal 40 of an external device (not shown). In this case, the voltage (Vdd) may be distributed by the pull-up resistance (Ru) and the pull-down resistance (Rd) of the electronic device 400, and the distributed voltage may be input into the control terminal (CTL) of the switch module 440 and the detection terminal (det) of the processor 410. At this time, since the pull-down resistance (Rd) is configured to have a very small value in comparison with the pull-up resistance (Ru), the distributed voltage may be a low signal. For example, the pull-up resistance (Ru) may be weak pull-up resistance of hundreds of kilohms to thousands of kilohms (for example, 1 megaohm), and the pull-down resistance (Rd) may be strong pull-down resistance of several ohms (for example, 1 kilohm).

According to some embodiments, the detection circuit 470 may include only the pull-up resistance (Ru), and the pull-down resistance (Rd) may be included in an external device (not shown). For example, when the external device is connected, the pull-up resistance (Ru) located in the electronic device 400 may be connected to the pull-down resistance (Rd) located in the external device, and the voltage distributed by the pull-up resistance (Ru) located in the electronic device 400 may be input into the control terminal (CTL) of the switch module 440 and the detection terminal (det) of the processor 410.

It has been described that the electronic device switches a plurality of matching circuits connected to the antenna 401 and the communication module 430 for mobile communication on the basis of whether or not an external device is connected. However, various embodiments of the disclosure are not limited thereto. For example, various embodiments of the disclosure may switch matching circuits connected to an antenna (not shown) and a short-range communication module (not shown) for short-range wireless communication (for example, Wi-Fi or Bluetooth) on the basis of whether or not the external device is connected. According to another embodiment, a plurality of matching circuits connected to an antenna (not shown) and an FM communication module (not shown) for frequency modulation (FM) communication (for example, radio) may be switched on the basis of whether or not the external device is connected.

Meanwhile, although not illustrated in FIG. 4, the electronic device 400 may not include some of the described elements. In another embodiment, the electronic device 400 may further include at least one other element (for example, a digital broadcasting module or a sensor module (for example, a fingerprint recognition sensor), an iris sensor, a proximity sensor, a touch screen, or a battery) at the level equivalent to the above-described elements.

Figure 5:
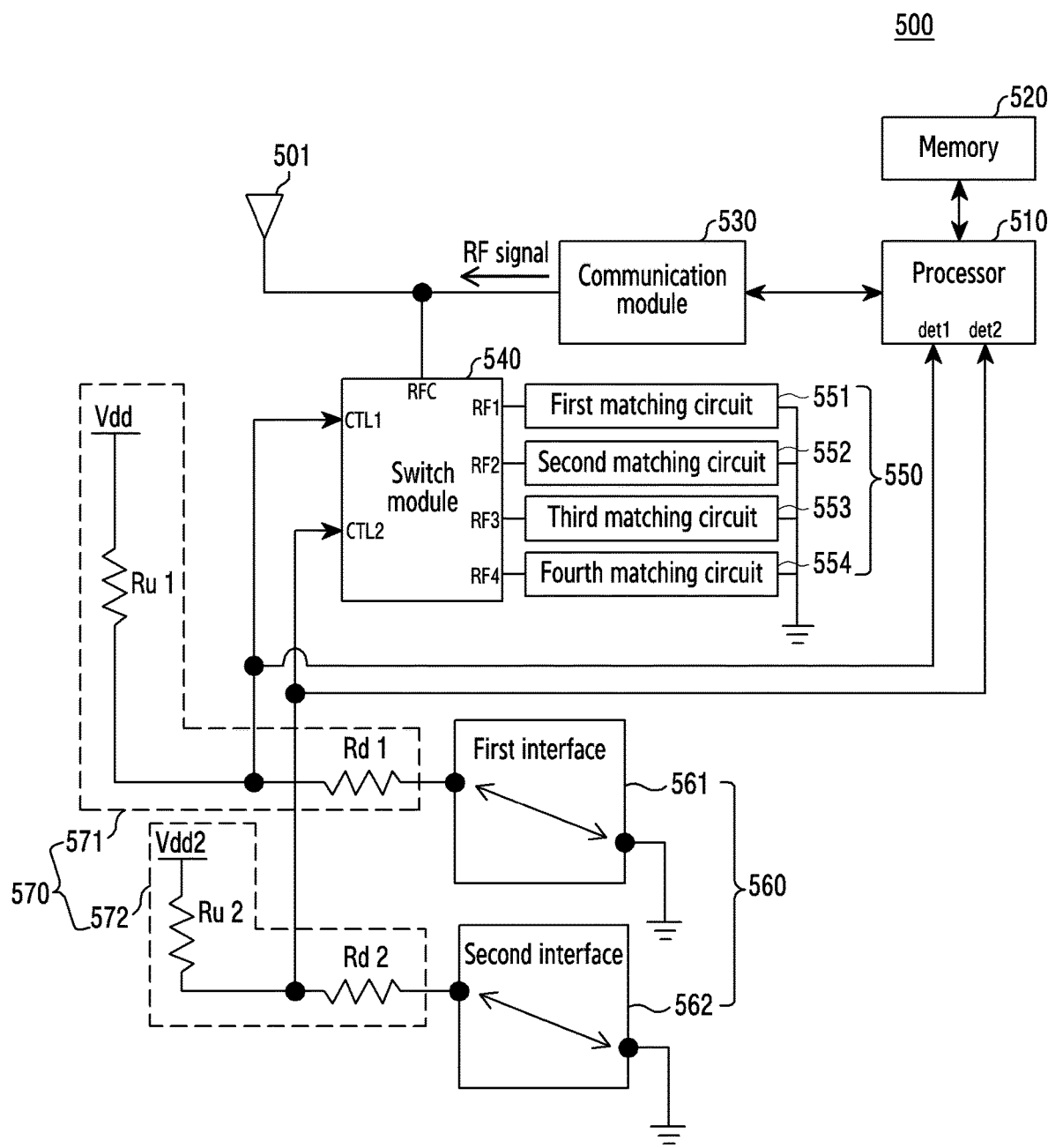
FIG. 5 illustrates the configuration of an electronic device according to an embodiment of the disclosure.

FIG. 5 illustrates the configuration of an electronic device according to an embodiment of the disclosure.

Referring to FIG. 5, an electronic device 500 according to an embodiment of the disclosure may include, for example, all or some of the electronic device 101 illustrated in FIG. 1 or the electronic device 201 illustrated in FIG. 2. The electronic device 500 may include an antenna 501, a processor 510, a memory 520, a communication module 530, a switch module 540, a matching circuit module 550, an interface module 560, and a detection circuit module 570.

The electronic device 500 of FIG. 5 may control the switch module 540 so that the antenna 501 is connected to one of a plurality of matching circuits 551, 552, 553, and 554 according to whether or not a plurality of external devices is connected. In other words, when the number of external devices that influence the performance of the antenna 501 is plural, the electronic device 500 of FIG. 5 may operate similarly to the electronic device 400 of FIG. 4 except that the matching circuits are switched in consideration of whether or not each of the plurality of external devices is connected. Accordingly, hereinafter, a detailed description of duplicate elements will be omitted for convenience of description.

The electronic device 500 may include a plurality of interfaces 561 and 562 and a plurality of detection circuits 571 and 572 in consideration of whether or not a plurality of external devices is connected. For example, the first detection circuit 571 may detect the connection of the external device (first external device) to the first interface 561, and the second detection circuit 572 may detect the connection of another external device (second external device) to the second interface 562.

The switch module 540 according to various embodiments of the disclosure may include two control terminals (CTL 1 and CTL 2), one input terminal (RFC), and four output terminals (RF 1, RF 2, RF 3, and RF 4), and the matching circuit module 550 may include four matching circuits (for example, first to fourth matching circuits 551, 552, 553, and 554). The first matching circuit 551 may be a matching circuit designed such that the antenna 501 has optimal radiation performance (efficiency) in a default state, in which the first external device and the second external device are not connected, the second matching circuit 552 may be a circuit designed such that the antenna 501 has optimal radiation performance (efficiency) in the state in which the first external device is connected, the third matching circuit 553 may be a circuit designed such that the antenna 501 has optimal radiation performance (efficiency) in the state in which the second external device is connected, and the fourth matching circuit 554 may be a circuit designed such that the antenna 501 has optimal radiation performance (efficiency) in the state in which the first external device and the second external device are connected.

According to some embodiments, at least some of the first to fourth matching circuits 551, 552, 553, and 554 of the matching circuit module 550 may be the same. For example, the first matching circuit 551 and the third matching circuit 553 may be the same matching circuits, and the second matching circuit 552 and the fourth matching circuit 554 may be the same matching circuits. The reason for this is that, when the first external device is connected to the first interface 561 or when the second external device is connected to the second interface 562, the same matching circuits can be used if changes in impedance or shift levels of the resonant frequency are the same or almost the same as each other. According to some embodiments, the first output terminal (RF 1) and the third output terminal (RF 3) of the matching circuit module 550 may be connected to one matching circuit, and the second output terminal (RF 2) and the fourth output terminal (RF 4) may be connected to one matching circuit. For example, the matching circuit module 550 may include two matching circuits, the first output terminal (RF 1) to the third output terminal (RF 3) may be connected to the first matching circuit, and the second output terminal (RF 2) and the fourth output terminal (RF 4) may be connected to the second matching circuit.

The first detection circuit 571 according to an embodiment of the disclosure may be connected to a first control terminal (CTL 1) of the switch module 540 and a first detection terminal (det 1) of the processor 510, and thus may transmit a high signal to the first control terminal (CTL 1) and the first detection terminal (det 1) of the processor 510 when the first external device is not connected and transmit a low signal to the first control terminal (CTL 1) and the first detection terminal (det 1) of the processor 510 when the first external device is connected. The second detection circuit 572 may be connected to a second control terminal (CTL 2) of the switch module 540 and a second detection terminal (det 2) of the processor 510, and thus may transmit a high signal to the second control terminal (CTL 2) and the second detection terminal (det 2) of the processor 510 when the second external device is not connected and transmit a low signal to the second control terminal (CTL 2) and the second detection terminal (det 2) of the processor 510.

The switch module 540 may connect the input terminal (RFC) to one of the first to fourth output terminals (RF 1, RF 2, RF 3, and RF 4) according to a combination of control signals (for example, a high signal (H) or a low signal (L)) input into the first control terminal (CTL 1) and the second control terminal (CTL 2). For example, the switch module 540 may be switched as shown in [Table 1] below.

TABLE 1

| First control terminal | Second control terminal | Output terminal |
|---|---|---|
| H (first external device is not connected) | H (second external device is not connected) | Connection to first output terminal |
| L (first external device is connected) | H (second external device is not connected) | Connection to second output terminal |
| H (first external device is not connected) | L (second external device is connected) | Connection to third output terminal |
| L (first external device is connected) | L (second external device is connected) | Connection to fourth output terminal |

The electronic device 500 according to an embodiment of the disclosure may detect the connection of a plurality of external devices and appropriately switch matching circuits, thereby appropriately compensating for a change in the impedance of the antenna and/or a shift in the resonant frequency according to the connection of a plurality of external devices.

Figure 6:
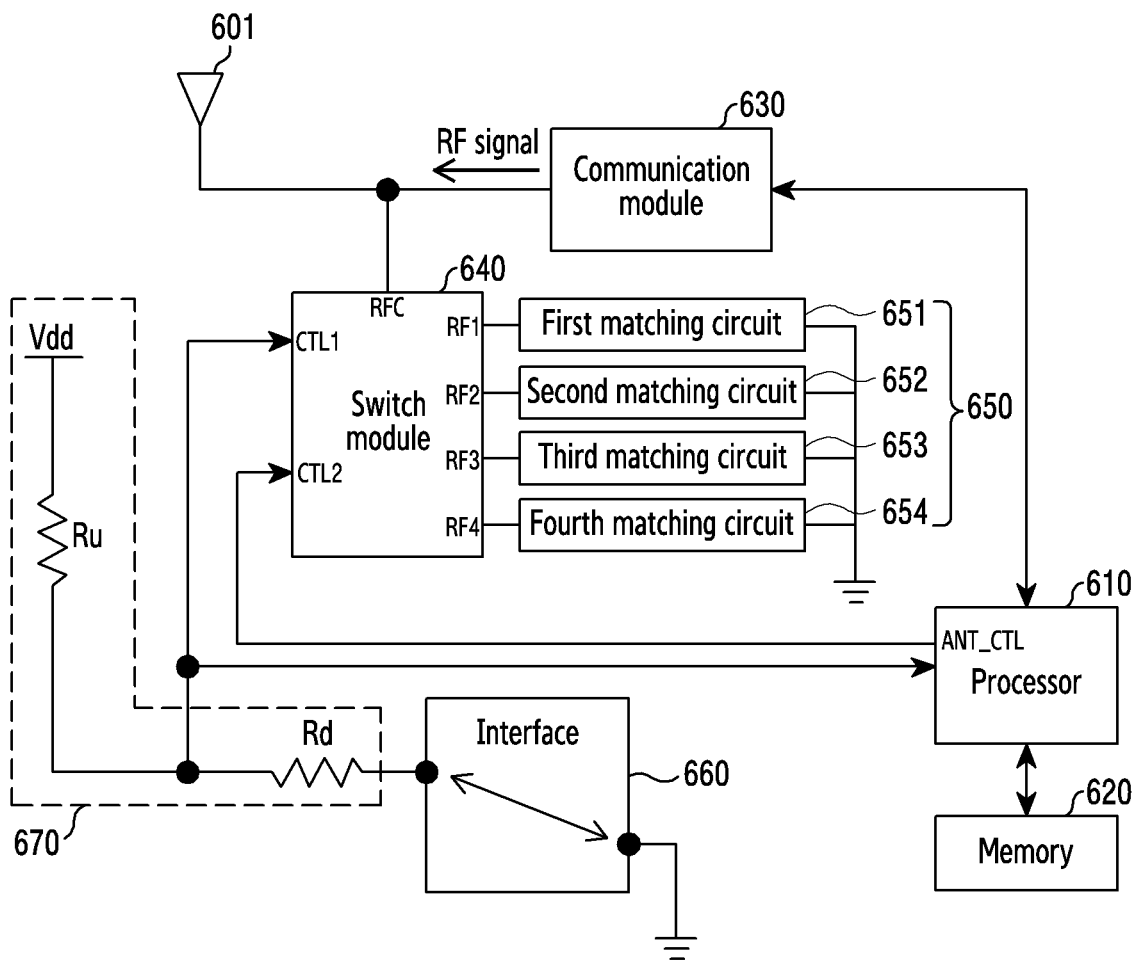
FIG. 6 illustrates the configuration of an electronic device according to an embodiment of the disclosure.

FIG. 6 illustrates the configuration of an electronic device according to an embodiment of the disclosure.

Referring to FIG. 6, an electronic device 600 according to an embodiment of the disclosure may include all or some of the electronic device 101 illustrated in FIG. 1 or the electronic device 201 illustrated in FIG. 2. The electronic device 600 may include an antenna 601, a processor 610, a memory 620, a communication module 630, a switch module 640, a matching circuit module 650, an interface 660, and a detection circuit 670.

The electronic device 600 of FIG. 6 may control the switch module 640 so that the antenna 601 is connected to one of a plurality of matching circuits 651, 652, 653, and 654 according to whether one external device is connected, a communication state (for example, a frequency band in which communication is currently performed), a currently used function, or a currently used sensor. In other words, the electronic device 600 of FIG. 6 may combine the electronic device 400 of FIG. 4, which considers whether one external device is connected, and an algorithm (software), which considers a communication state. Accordingly, hereinafter, a detailed description of duplicate elements will be omitted for convenience of description.

The processor 610 according to various embodiments of the disclosure may control the switching of the switch module 640. The processor 610 may include a control terminal (ANT_CTL) for outputting a control signal that controls the switching of the switch module 640. The control terminal (ANT_CTL) may be one of various types of interfaces (General Purpose Input/Output (GPIO), a Mobile Industry Processor Interface (MIPI), and an Inter-Integrated Circuit (I2C)).

The processor 610 according to various embodiments of the disclosure may control switching of the switch module 640 in consideration of the communication state. For example, the processor 610 according to various embodiments of the disclosure may control switching of the switch module 640 according to the currently used frequency band. This takes into account the phenomenon whereby the extent of influence of radiation performance of the antenna 601 varies depending on the frequency band during the connection with the external device. For example, this considers that the antenna 601 may perform communication in a plurality of frequency bands, and changes in impedance or changes in a resonant frequency in respective frequency bands may be different from each other when the external device is connected.

The processor 610 according to various embodiments of the disclosure may identify a currently used frequency band and transmit a control signal according to the result of identification to the second control terminal (CTL 2) of the switch module 640 through the control terminal (ANT_CTL). For example, the processor 610 may transmit a first control signal (for example, a high signal) to the second control terminal (CTL 2) of the switch module 640 when the currently used frequency band is a frequency band that is little influenced by the connection of the external device (for example, 700 MHz to 1000 MHz), and may transmit a second control signal (for example, a low signal) to the second control terminal (CTL 2) of the switch module 640 when the currently used frequency band is a band that is significantly influenced by the connection of the external device (for example, an intermediate frequency band between 1500 MHz to 2100 MHz or a high frequency band between 2200 MHz and 2700 MHz). In other words, the processor 610 may transmit the first control signal to the switch module 640 when the currently used frequency band is a band in which the impedance of the antenna 601 or the resonant frequency is changed to a value smaller than a predetermined value when the external device is connected, and may transmit the second control signal to the switch module 640 when the currently used frequency band is a band in which the impedance of the antenna 601 or the resonant frequency is changed to the predetermined value or higher.

The memory 620 according to various embodiments of the disclosure may store an algorithm for controlling switching of the switch module 640 according to a communication state. For example, the algorithm may include a routine for identifying a currently used frequency band and a routine for generating a control signal according to the result of identification and transmitting the control signal to the second control terminal (CTL 2) of the switch module 640 through the control terminal (ANT_CTL). The routine for generating the control signal may generate a high signal when the currently used frequency band is a frequency band that is hardly influenced by the connection of the external device and may generate a low signal when the currently used frequency band is a band that is significantly influenced by the connection of the external device. The memory 620 may store a mapping table in which a plurality of communication frequency bands and at least one control signal are mapped.

The switch module 640 according to various embodiments of the disclosure may include two control terminals (CTL 1 and CTL 2), one input terminal (RFC), and four output terminals (RF 1, RF 2, RF 3, and RF 4), and the matching circuit module 650 may include four matching circuits (for example, first to fourth matching circuits 651, 652, 653, and 654).

The switch module 640 may connect the input terminal (RFC) with one of the first to fourth output terminals (RF 1, RF 2, RF 3, and RF 4) according to a combination of the control signals input into the first control terminal (CTL 1) and the second control terminal (CTL 2). For example, the switch module 640 may be switched as shown in [Table 2] below.

TABLE 2

| First control terminal | Second control terminal | Output terminal |
| --- | --- | --- |
| H (first external device is not connected) | H (band that is hardly influenced) | Connection to first output terminal |
| L (first external device is connected) | H (band that is hardly influenced) | Connection to second output terminal |
| H (first external device is not connected) | L (band that is significantly influenced) | Connection to third output terminal |
| L (first external device is connected) | L (band that is significantly influenced) | Connection to fourth output terminal |

In [Table 2] above, the processor 610 controls switching of the switch module 640 in consideration of two cases (the band that is significantly influenced and the band that is hardly influenced). However, the disclosure is not limited thereto. For example, the processor 610 may include two or more control terminals in order to consider three or more cases. For example, if a plurality of frequency bands supported by the antenna 601 cannot be divided into two cases (for example, the band that is significantly influenced and the band that is hardly influenced), the frequency bands may be divided into three or more cases according to a change in the impedance of the antenna 601 or a shift in the resonant frequency, and the processor 610 may control switching of the switch module 640 through a plurality of control terminals. For example, the processor 610 may include two control terminals when the plurality of frequency bands is divided into four cases and include three control terminals when the plurality of frequency bands is divided into eight cases. At this time, the switch module 640 may include second control terminals corresponding to the number of control terminals included in the processor 610. The matching circuit module 650 may include a plurality of matching circuits corresponding to the first control terminal (CTL 1) and the second control terminal (CTL 2) included in the switch module 640. For example, when the switch module 640 includes one first control terminal (CTL 1) and two second control terminals (CTL 2), the matching circuit module 650 may include 8(=2³) matching circuits.

According to some embodiments, the processor 610 may include control terminals according to the number of frequency bands supported by the antenna 601. For example, the processor 610 may include two control terminals when the antenna 601 supports a number of frequency bands larger than 2 and equal to or smaller than 4, and may include three control terminals when the antenna 601 supports a number of frequency bands larger than 4 and equal to or smaller than 8.

According to some embodiments, the number of control terminals may be determined according to the number of frequency bands within which it is required to control matching circuits, among the frequency bands supported by the antenna 601, on the basis of the connection of the external device. For example, when two frequency bands are not influenced or little influenced by the connection of the external device among the six frequency bands supported by the antenna 601, it is determined that the number of control terminals is 2.

According to some embodiments, at least some of the first to fourth matching circuits 651, 652, 653, and 654 of the matching circuit module 650 may be the same as each other. For example, the first matching circuit 651 and the second matching circuit 652 may be the same matching circuit. This is because a matching circuit change is not needed if the currently used frequency band is not influenced by the connection of the external device or is little influenced thereby. According to some embodiments, the first output terminal (RF 1) and the second output terminal (RF 2) of the matching circuit module 650 may be connected to one matching circuit. For example, the matching circuit module 650 may include three matching circuits, the first output terminal (RF 1) and the second output terminal (RF 2) may be connected to a first matching circuit, the third output terminal (RF 3) may be connected to a second matching circuit, and the fourth terminal (RF 4) may be connected to a third matching circuit.

In FIG. 6, the processor 610 controls the switching of the switch module 640 in consideration of the currently used frequency band. According to some embodiments, the processor 610 may control the switching of the switch module 640 on the basis of various conditions that may influence the performance of the antenna 601. For example, the processor 610 may control the switching of the switch module 640 on the basis of a currently used sensor (for example, detection of a user's grip adjacent to the antenna through a grip sensor, detection of an open/closed state of a folder or a slide in a folder-type or a slide-type electronic device through a magnetic or a hall sensor, detection of mounting of an accessory (for example, a protection cover), detection of a degree of folding (bending) of a flexible electronic device through a bending sensor, and detection of contact of a face through a proximity sensor or an illumination sensor). According to another embodiment, the processor 610 may control switching of the switch module 640 on the basis of activation of a currently used function (activation of a module located adjacent to the antenna (for example, a camera module or a speaker module) or activation of a quick charging or a wireless charging function).

The electronic device 600 according to the embodiment may provide optimal performance of the antenna in a greater variety of conditions according to a combination of hardware circuits and algorithms (software). The electronic device 600 according to the embodiment may overcome the disadvantage that occurs when only hardware circuits are used. The electronic device 600 according to the embodiment may use a simplified algorithm in comparison with control only through a software scheme, thereby preventing a software error.

Figure 7:
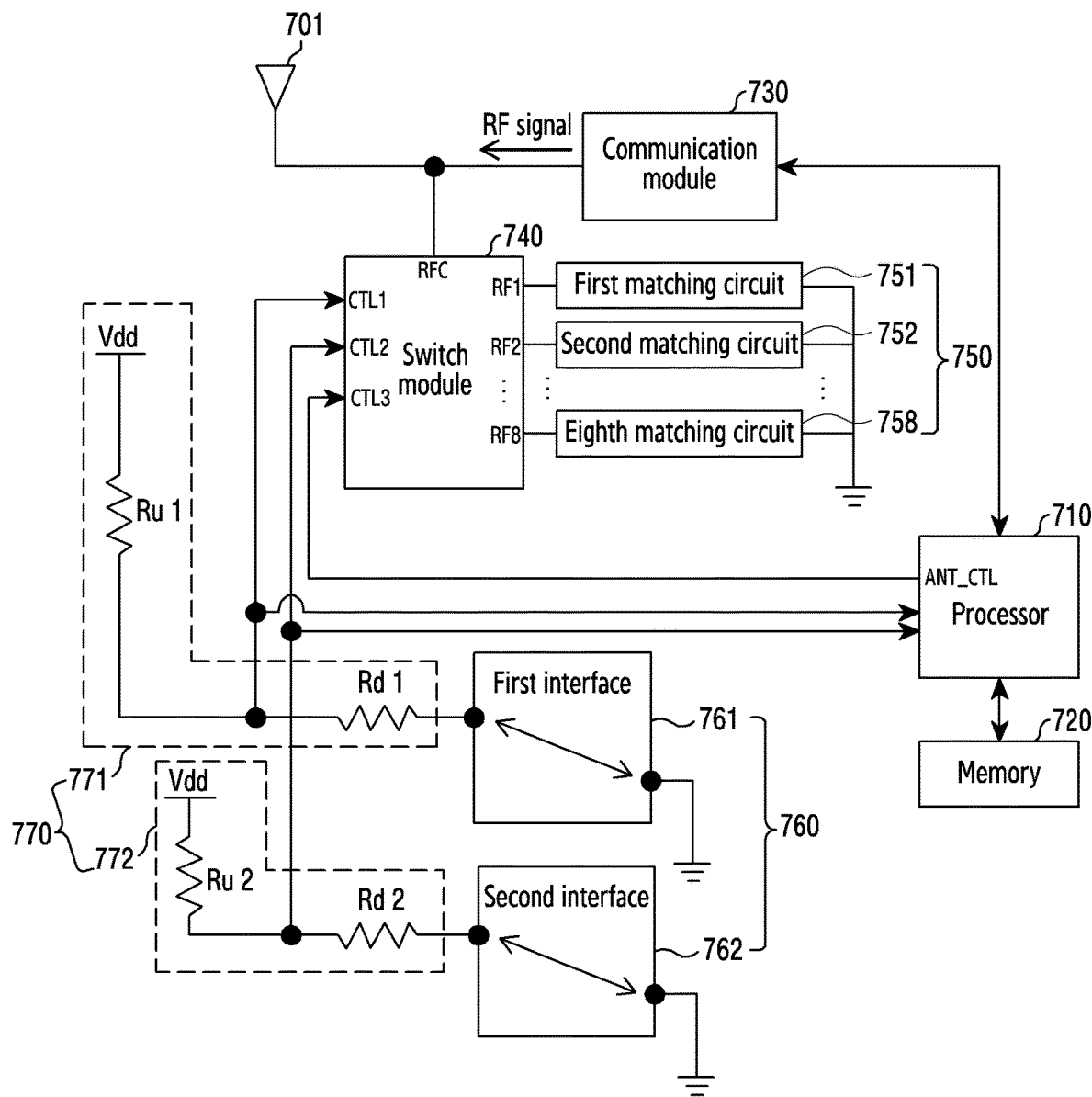
FIG. 7 illustrates the configuration of an electronic device according to an embodiment of the disclosure.

FIG. 7 illustrates the configuration of an electronic device according to an embodiment of the disclosure.

Referring to FIG. 7, an electronic device 700 according to an embodiment of the disclosure may include, for example, all or some of the electronic device 101 illustrated in FIG. 1 or the electronic device 201 illustrated in FIG. 2. The electronic device 700 may include an antenna 701, a processor 710, a memory 720, a communication module 730, a switch module 740, a matching circuit module 750, an interface module 760, and a detection circuit module 770.

The electronic device 700 of FIG. 7 may operate similarly to the electronic device 600 of FIG. 6 except that the connection of a plurality of external devices is considered rather than the connection of one external device. Accordingly, hereinafter, a detailed description of duplicate elements will be omitted for convenience of description.

The interface module 760 according to an embodiment of the disclosure may include a first interface 761 to which a first external device is connected and a second interface 762 to which a second external device is connected. The detection circuit module 770 may include a first detection circuit 771 for detecting the connection of the first external device in the first interface 761 and a second detection circuit 772 for detecting the connection of the second external device in the second interface 762. The switch module 740 may include three control terminals (CTL 1, CTL 2, and CTL 3), one input terminal (RFC), and eight output terminals (RF 1, RF 2, . . . , RF 8). The matching circuit module 750 may include eight matching circuits (for example, first to eighth matching circuits 751, 752, . . . , 758).

The switch module 740 may connect the input terminal (RFC) with one of the first to eighth terminals (RF 1, RF 2, . . . , RF 8) according to a combination of control signals (for example, a high signal (H) and a low signal (L)) input into the first control terminal (CTL 1), the second control terminal (CTL 2), and the third control terminal (CTL 3). For example, the switch module 740 may be switched as shown in [Table 3] below.

TABLE 3

| First control terminal | Second control terminal | Third control terminal | Output terminal |
|---|---|---|---|
| H (first external device is not connected) | H (second external device is not connected) | H (band that is hardly influenced) | First output terminal |
| H (first external device is not connected) | L (second external device is connected) | H (band that is hardly influenced) | Second output terminal |
| H (first external device is not connected) | H (second external device is not connected) | L (band that is significantly influenced) | Third output terminal |

TABLE 3-continued

| First control terminal | Second control terminal | Third control terminal | Output terminal |
|---|---|---|---|
| H (first external device is not connected) | L (second external device is connected) | L (band that is significantly influenced) | Fourth output terminal |
| L (first external device is connected) | H (second external device is not connected) | H (band that is hardly influenced) | Fifth output terminal |
| L (first external device is connected) | L (second external device is connected) | H (band that is hardly influenced) | Sixth output terminal |
| L (first external device is connected) | H (second external device is not connected) | L (band that is significantly influenced) | Seventh output terminal |
| L (first external device is connected) | L (second external device is connected) | L (band that is significantly influenced) | Eighth output terminal |

Figure 8:
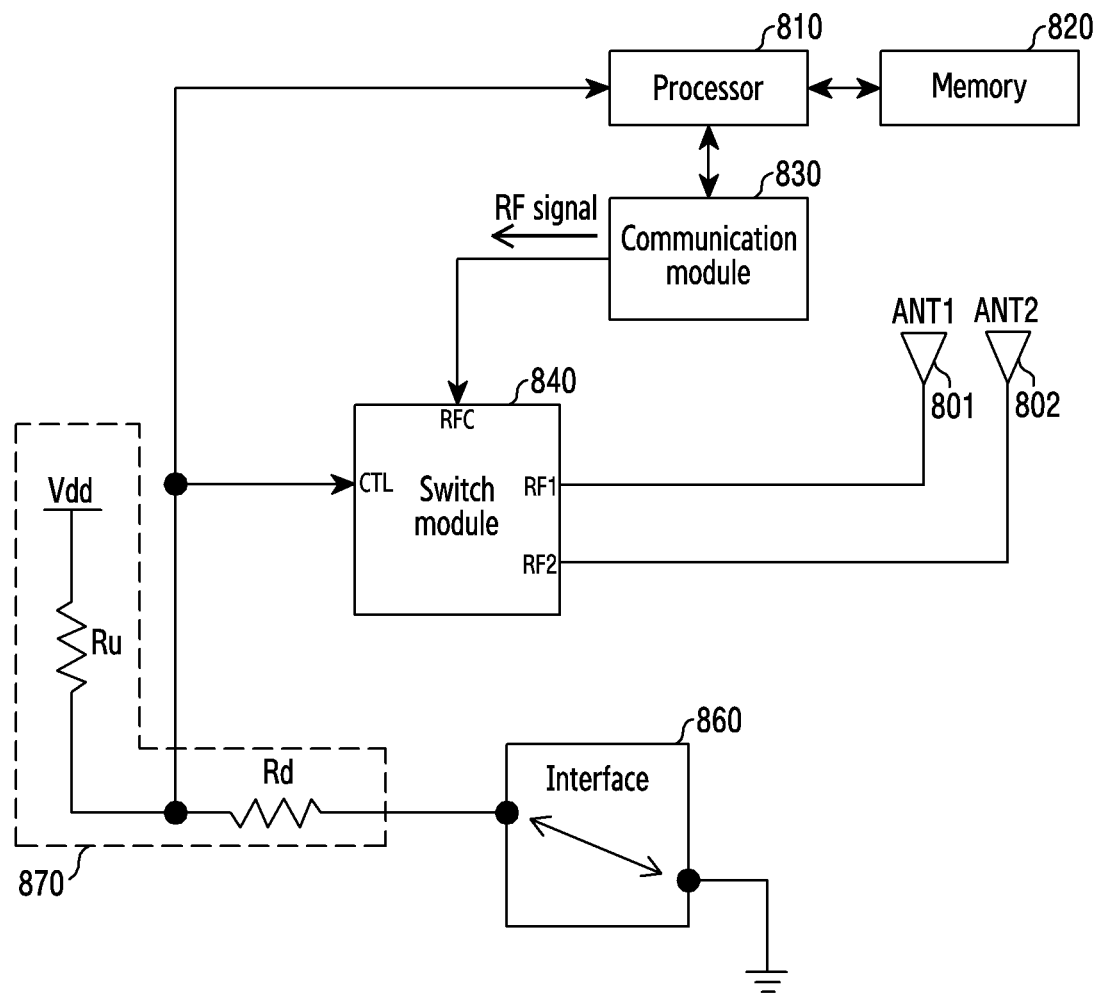
FIG. 8 illustrates the configuration of an electronic device according to an embodiment of the disclosure.

FIG. 8 illustrates the configuration of an electronic device according to an embodiment of the disclosure.

Referring to FIG. 8, an electronic device 800 according to an embodiment of the disclosure may include, for example, all or some of the electronic device 101 illustrated in FIG. 1 or the electronic device 201 illustrated in FIG. 2. The electronic device 800 may include a first antenna 801, a second antenna 802, a processor 810, a memory 820, a communication module 830, a switch module 840, an interface 860, and a detection circuit 870. Hereinafter, a detailed description of duplicate elements will be omitted for convenience of description.

The electronic device 800 according to an embodiment of the disclosure may control the communication module 830 to be connected to another antenna according to whether or not the external device is connected. For example, when the external device is not connected to the interface 860, the detection circuit 870 may provide a high signal to a control terminal (CTL) of the switch module 840. When the high signal is input into the control terminal (CTL), the switch module 840 may be switched to connect the input terminal (RFC) with the first output terminal (RF 1) so that the communication module 830 may transmit and receive a radio signal through the first antenna 801. On the other hand, when the external device is connected to the interface 860, the detection circuit 870 may provide a low signal to the control terminal (CTL) of the switch module 840. The switch module 840 may be switched to connect the input terminal (RFC) with the second output terminal (RF 2) so that the communication module 830 may transmit and receive a radio signal through the second antenna 802. The first antenna 801 may be an antenna designed to have optimal radiation performance (efficiency) in the state in which the external device is not connected, and the second antenna 802 may be an antenna designed to have optimal radiation performance (efficiency) in the state in which the external device is connected. The second antenna 802 may be an antenna separately designed to compensate for an impedance change and/or resonant frequency shift due to the connection of the external device. According to some embodiments, the second antenna 802 may be one of a plurality of antennas (for example, a Wi-Fi or Bluetooth antenna, a GPS antenna, or a diversity antenna) generally installed in the electronic device 800 rather than a separately designed and installed antenna.

Meanwhile, in FIG. 8, switching is performed such that a radio signal is transmitted and received using one of a plurality of antennas according to whether or not one external device is connected. Similar to FIG. 5, the electronic device according to some embodiments may perform switching to transmit and receive a radio signal through one of a plurality of antennas (for example, four antennas) in consideration of whether or not a plurality of external devices is connected. Similar to FIG. 6, the electronic device according to another embodiment may perform switching to transmit and receive a radio signal through one of a plurality of antennas (for example, four antennas) in consideration of whether or not one external device is connected and the communication state. Similar to FIG. 7, the electronic device according to yet another embodiment may perform switching to transmit and receive a radio signal through one of a plurality of antennas (for example, eight antennas) in consideration of whether or not a plurality of external devices is connected and the communication state.

Figure 9:
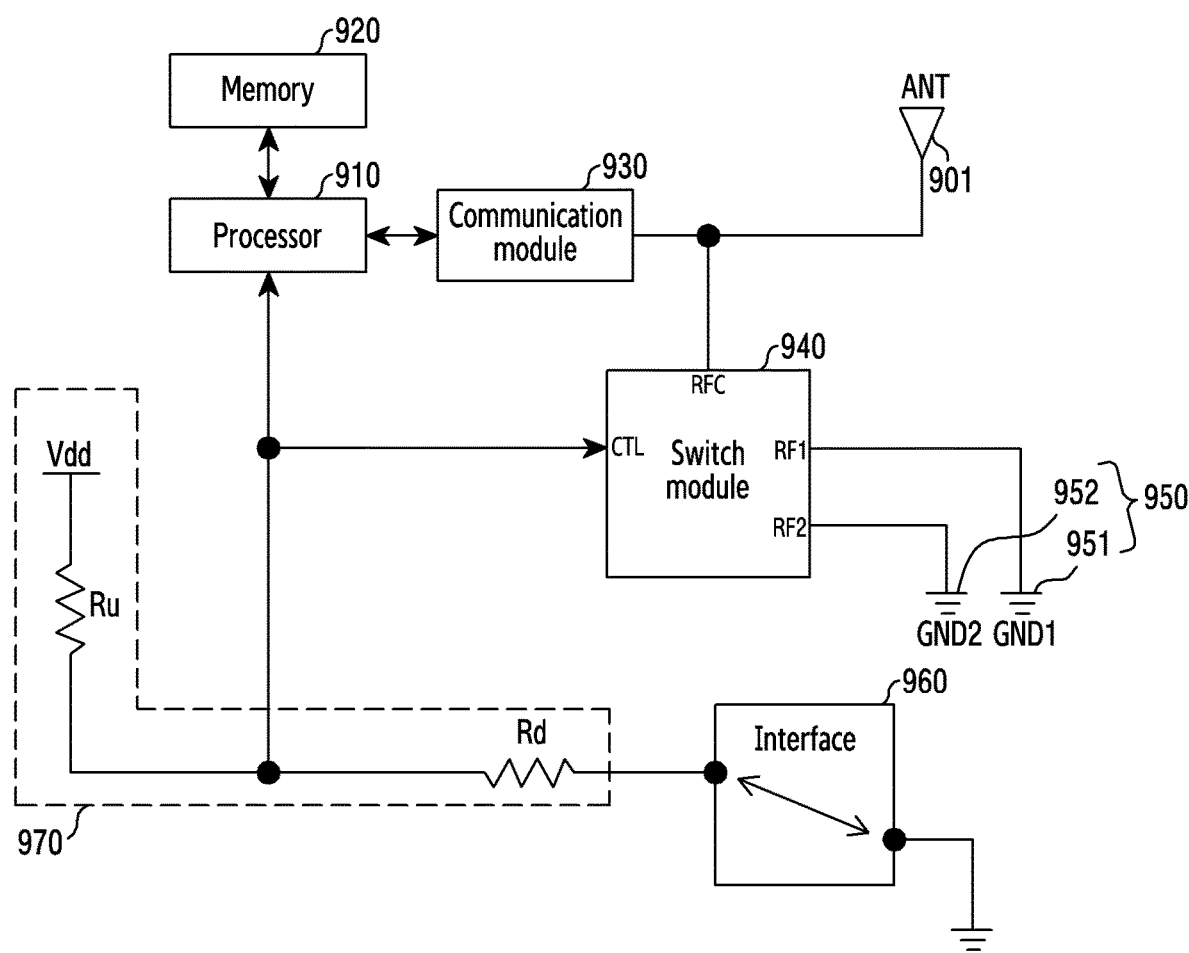
FIG. 9 illustrates the configuration of an electronic device according to an embodiment of the disclosure.

FIG. 9 illustrates the configuration of an electronic device according to an embodiment of the disclosure.

Referring to FIG. 9, an electronic device 900 according to an embodiment of the disclosure may include, for example, all or some of the electronic device 101 illustrated in FIG. 1 or the electronic device 201 illustrated in FIG. 2. The electronic device 900 may include an antenna 901, a processor 910, a memory 920, a communication module 930, a switch module 940, a matching circuit module 950, an interface 960, and a detection circuit 970. Hereinafter, a detailed description of duplicate elements will be omitted for convenience of description.

The electronic device 900 according to an embodiment of the disclosure may control the antenna 901 to have another grounding portion depending on whether or not the external electronic device is connected. For example, when the external device is not connected to the interface 960, the detection circuit 970 may provide a high signal to a control terminal (CTL) of the switch module 940. When a high signal is input into a control terminal (CTL), the switch module 940 may connect an input terminal (RFC) and a first output terminal (RF 1) so that the antenna 901 is connected to the ground of the electronic device 900 through a first grounding portion 951. On the other hand, when the external device is connected to the interface 960, the detection circuit 970 may provide a low signal to the control terminal (CTL) of the switch module 940. When a low signal is input into the control terminal (CTL), the switch module 940 may connect the input terminal (RFC) and a second output terminal (RF 2) so that the antenna 901 is connected to the ground of the electronic device 900 through a second grounding portion 952. The first grounding portion 951 may be located at a first location designed such that the antenna 901 has optimal radiation performance (efficiency) in the state in which the external device is not connected, and the second grounding portion 952 may be located at a second location designed such that the antenna 901 has optimal radiation performance (efficiency) in the state in which the external device is connected. The first location and the second location may be different from each other. As described above, in the electronic device 900 of FIG. 9, the first grounding portion 951 and the second grounding portion 952 may serve as matching circuits.

Meanwhile, in FIG. 9, the antenna 901 has different grounding portions depending on whether or not one external device is connected. However, similar to FIG. 5, the electronic device according to some embodiments may switch the antenna 901 to have a plurality of grounding portions (for example, four grounding portions) in consideration of whether or not a plurality of external devices is connected. Similar to FIG. 6, the electronic device according to another embodiment may switch the antenna 901 to have one of a plurality of grounding portions (for example, four grounding portions) in consideration of whether or not one external device is connected and the communication state. Similar to FIG. 7, the electronic device according to yet another embodiment may switch the antenna 901 to have one of a plurality of grounding portions (for example, eight grounding portions) in consideration of whether or not a plurality of external devices is connected and the communication state.

The electronic device 900 according to the various embodiments of the disclosure may change the grounding portion of the antenna 901 depending on whether or not at least one external device is connected and/or the communication state so as to change the electrical length of the grounding portion of the antenna 901, thereby preventing a decrease in performance of the antenna 901 due to the connection of the at least one external device.

Figure 10:
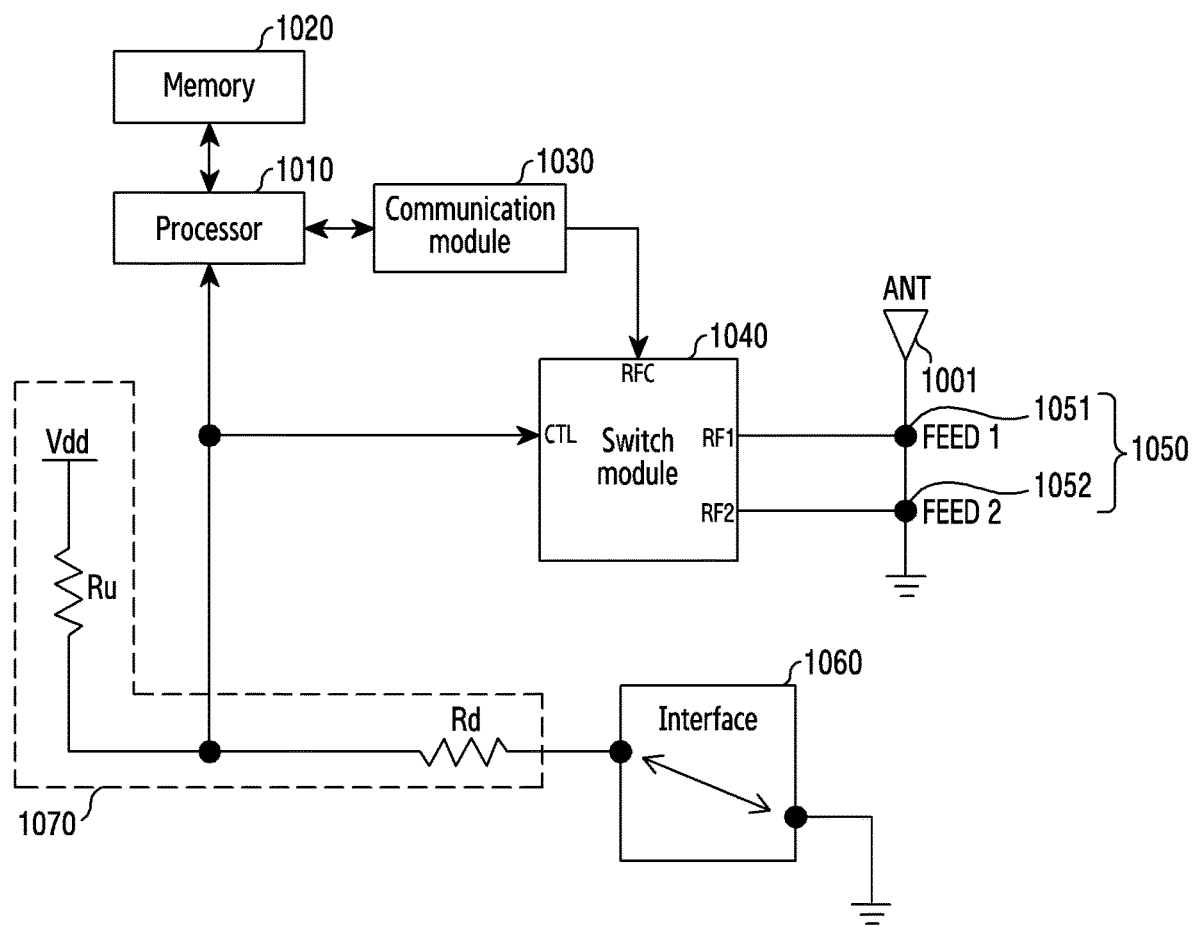
FIG. 10 illustrates the configuration of an electronic device according to an embodiment of the disclosure.

FIG. 10 illustrates the configuration of an electronic device according to an embodiment of the disclosure.

Referring to FIG. 10, an electronic device 1000 according to an embodiment of the disclosure may include, for example, all or some of the electronic device 101 illustrated in FIG. 1 or the electronic device 201 illustrated in FIG. 2. The electronic device 1000 may include an antenna 1001, a processor 1010, a memory 1020, a communication module 1030, a switch module 1040, a matching circuit module 1050, an interface 1060, and a detection circuit 1070. Hereinafter, a detailed description of duplicate elements will be omitted for convenience of description.

The electronic device 1000 according to an embodiment of the disclosure may control the antenna 1001 to have different feeding portions depending on whether or not the external device is connected. For example, when the external device is not connected to the interface 1060, the detection circuit 1070 may provide a high signal to a control terminal (CTL) of the switch module 1040. When a high signal is input into the control terminal (CTL), the switch module 1040 may connect the input terminal (RFC) and a first output terminal (RF 1) such that the antenna 1001 is connected to the communication module 1030 through a first feeding portion 1051. On the other hand, when the external device is connected to the interface 1060, the detection circuit 1070 may provide a low signal to the control terminal (CTL) of the switch module 1040. When a low signal is input into the control terminal (CTL), the switch module 1040 may connect the input terminal (RFC) and a second output terminal (RF 2) such that the antenna 1001 is connected to the communication module 1030 through a second feeding portion 1052. The first feeding portion 1051 may be located at a first location designed such that the antenna 1001 has optimal radiation performance (efficiency) in the state in which the external device is not connected, and the second feeding portion 1052 may be located at a second location designed such that the antenna 1001 has optimal radiation performance (efficiency) in the state in which the external device is connected. The first location and the second location may be different from each other. As described above, in the electronic device 1000 of FIG. 10, the first feeding portion 1051 and the second feeding portion 1052 may serve as matching circuits.

Meanwhile, in FIG. 10, the antenna 1001 is connected to the communication module 1030 through different feeding portions depending on whether or not one external device is connected. However, similar to FIG. 5, the electronic device according to some embodiments may connect the antenna 1001 and the communication module 1030 through one of a plurality of feeding portions (for example, four feeding portions) in consideration of whether or not a plurality of external devices is connected. Similar to FIG. 6, the electronic device according to another embodiment may connect the antenna 1001 and the communication module 1030 through one of a plurality of feeding portions (for example, four feeding portions) in consideration of whether or not one external device is connected and the communication state. Similar to FIG. 7, the electronic device according to yet another embodiment may connect the antenna 1001 and the communication module 1030 through one of a plurality of feeding portions (for example, eight feeding portions) in consideration of whether or not a plurality of external devices is connected and the communication state.

The electronic device 1000 according to various embodiments of the disclosure may change feeding portions of the antenna 1001 depending on whether or not at least one external device is connected and/or the communication state, thereby preventing a decrease in the performance of the antenna 1001 due to the connection of the at least one external device.

An electronic device (for example, the electronic device 101, the electronic device 201, the electronic device 400, the electronic device 500, the electronic device 600, the electronic device 700, the electronic device 900, or the electronic device 1000) according to various embodiments of the disclosure may include: at least one interface (for example, the input/output interface 150, the interface 270, the interface 460, the interface module 560, the interface 660, the interface module 760, the interface 960, or the interface 1060); at least one detection circuit (for example, the detection circuit 470, the detection circuit module 570, the detection circuit 670, the detection circuit module 770, the detection circuit 970, or the detection circuit 1070) configured to detect a connection between each of at least one external device and the at least one interface; at least two matching circuits (for example, the matching circuit module 450, the matching circuit module 550, the matching circuit module 650, the matching circuit module 750, the matching circuit module 950, or the matching circuit module 1050); an antenna (for example, the antenna 401, the antenna 501, the antenna 601, the antenna 701, the antenna 901, or the antenna 1001); and a switch module (for example, the switch module 440, the switch module 540, the switch module 640, the switch module 740, the switch module 940, or the switch module 1040) configured to receive at least one signal corresponding to the connection or non-connection between the at least one external device and the at least one interface from the at least one detection circuit and to connect the antenna with a matching circuit corresponding to the at least one signal among the at least two matching circuits.

According to various embodiments, the at least one interface may include a first interface (for example, the first interface 561 or the second interface 562) and a second interface (for example, the second interface 562 or the second interface 762), the at least one detection circuit may include a first detection circuit (for example, the first detection circuit 571 or the second detection circuit 751) configured to detect whether a first external device is connected to the first interface and a second detection circuit (for example, the second detection circuit 572 or the second detection circuit 772) configured to detect whether a second external device is connected to the second interface, and the at least two matching circuits may include a first matching circuit (for example, the first matching circuit 551 or the first matching circuit 651) connected to the antenna when there is no connection of the first external device and the second external device, a second matching circuit (for example, the second matching circuit 552 or the second matching circuit 652) connected to the antenna when the first external device is connected, a third matching circuit (for example, the third matching circuit 553 or the third matching circuit 653) connected to the antenna when the second external device is connected, and a fourth matching circuit (for example, the fourth matching circuit 554 or the fourth matching circuit 654) connected to the antenna when the first and second external devices are connected.

According to various embodiments, the at least two matching circuits may include at least one of a resistor, a capacitor, and an inductor connected in at least one of series and parallel.

According to various embodiments, the at least two matching circuits may include at least two feeding portions (for example, the first feeding portion 1051 and the second feeding portion 1052) located at different locations, and at least two ground portions (for example, the first grounding portion 951 and the second grounding portion 952) located at different locations.

According to various embodiments, the interface may include an audio interface, a micro Universal Serial Bus (USB) interface, or a USB type-C interface.

According to various embodiments, the electronic device may further include a processor (for example, the processor 120, the processor 210, the processor 610, or the processor 710) configured to receive the at least one signal from the at least one detection circuit, wherein the processor may transmit at least one control signal to the switch module based at least partially on a communication frequency band of the electronic device, and the switch module may be switched to connect the antenna with one of the at least two matching circuits based at least partially on the at least one signal and the at least one control signal.

According to various embodiments, the processor may transmit the at least one control signal to the switch module based at least partially on a change in the impedance of the antenna or in a resonant frequency in the communication frequency band due to the connection of the at least one external device.

According to various embodiments, the processor may transmit a first control signal to the switch module when the communication frequency band is a band in which the impedance of the antenna or the resonant frequency is changed to a value smaller than a predetermined size during the connection of the at least one external device and transmit a second signal to the switch module when the communication frequency band is a band in which the impedance of the antenna or the resonant frequency is changed to a value larger than or equal to the predetermined size.

According to various embodiments, the electronic device may further include a memory (for example, the memory 130, the memory 230, the memory 420, the memory 520, the memory 620, the memory 720, the memory 920, or the memory 1020) configured to store a mapping table in which a plurality of communication frequency bands supported by the antenna and the at least one control signal are mapped.

According to various embodiments, the at least one interface may be located adjacent to the antenna.

An electronic device (for example, the electronic device 101, the electronic device 201, or the electronic device 800) according to an embodiment of the disclosure may include at least one interface (for example, the input/output interface 150, the interface 270, or the interface 860), at least one detection circuit (for example, the detection circuit 870) configured to detect each of at least one external device connected to the at least one interface, a communication module (for example, the communication interface 170, the communication module 220, or the communication module 830), at least two antennas (for example, the first antenna 801 and the second antenna 802), and a switch module (for example, the switch module 840) configured to receive at least one signal corresponding to a connection or non-connection between the at least one external device and the at least one interface from the at least one detection circuit and connect the communication module with an antenna corresponding to the at least one signal among the at least two antennas.

According to various embodiments, the at least one interface may include a first interface and a second interface, the at least one detection circuit may include a first detection circuit configured to detect whether a first external device is connected to the first interface and a second detection circuit configured to detect whether a second external device is connected to the second interface, and the at least two antennas may include a first antenna connected to the communication module when there is no connection of the first external device and the second external device, a second antenna connected to the communication module when the first external device is connected, a third antenna connected to the communication module when the second external device is connected, and a fourth antenna connected to the communication module when the first and second external devices are connected.

According to various embodiments, the interface may include an audio interface, a micro Universal Serial Bus (USB) interface, or a USB type-C interface.

According to various embodiments, the electronic device may further include a processor (for example, the processor 120, the processor 210, or the processor 810) configured to receive the at least one signal from the at least one detection circuit, wherein the processor may transmit at least one control signal to the switch module based at least partially on the communication frequency band of the electronic device, and the switch module may be switched to connect one of the at least two antennas with the communication module based at least partially on the at least one signal and the at least one control signal.

According to various embodiments, the processor may transmit the at least one control signal to the switch module based at least partially on a change in the impedance of the antenna or in a resonant frequency in the communication frequency band due to the connection of the at least one external device.

According to various embodiments, the processor may transmit a first control signal to the switch module when the communication frequency band is a band in which the impedance of the antenna or the resonant frequency is changed to a value smaller than a predetermined size during the connection of the at least one external device, and may transmit a second signal to the switch module when the communication frequency band is a band in which the impedance of the antenna or the resonant frequency is changed to a value larger than or equal to the predetermined size.

According to various embodiments, the electronic device may further include a memory (for example, the memory 130, the memory 230, or the memory 820) configured to store a mapping table in which communication frequency bands supported by the antenna and the at least one control signal are mapped.

Figure 11:
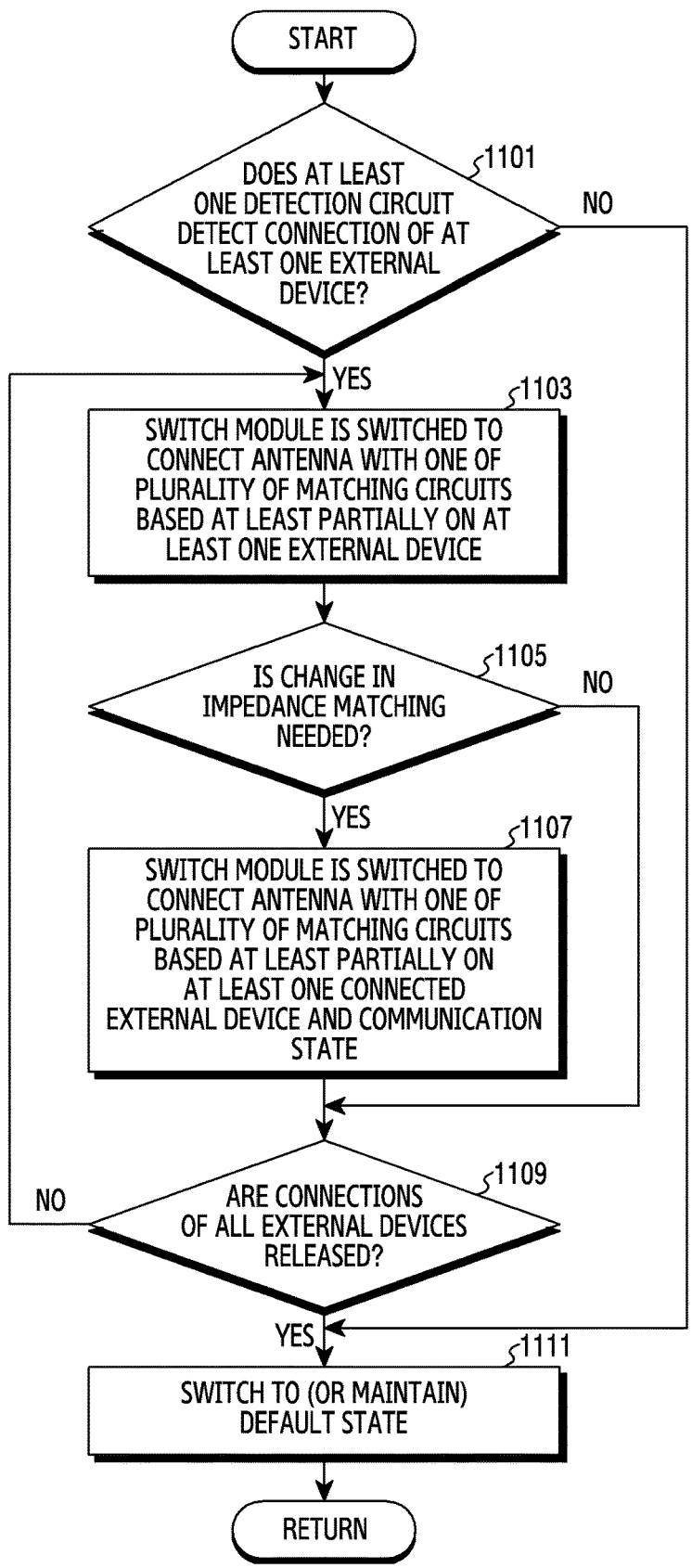
FIG. 11 is a flowchart illustrating a method of matching the impedance of an antenna by an electronic device according to an embodiment of the disclosure.

FIG. 11 is a flowchart illustrating a method of matching the impedance of an antenna by an electronic device according to an embodiment of the disclosure.

Referring to FIG. 11, according to various embodiments of the disclosure, at least one detection circuit (for example, the detection circuit 470, the detection circuit module 570, the detection circuit 670, the detection circuit module 770, the detection circuit 870, the detection circuit 970, or the detection circuit 1070) may detect the connection of at least one external device in operation 1101. For example, the at least one detection circuit may include a first detection circuit and a second detection circuit, and may detect whether a first external device is connected to a first interface through the first detection circuit and whether a second external device is connected to a second interface through the second detection circuit. When the connection of at least one external device is detected, the at least one detection circuit may supply a low signal to a control terminal of a switch module.

When the connection of at least one external device is not detected in operation 1101, the switch module according to various embodiments of the disclosure (for example, the switch module 440, the switch module 540, the switch module 640, the switch module 740, the switch module 840, the switch module 940, or the switch module 1040) may maintain a default state in operation 1111.

When the connection of at least one external device is detected in operation 1101, the switch module according to various embodiments of the disclosure may be switched to connect the antenna with one of a plurality of matching circuits on the basis of at least some of the at least one connected external device in operation 1103. For example, when a low signal is input into the control terminal, the switch module may be switched to connect the antenna with a matching circuit corresponding to the at least one connected external device among the plurality of matching circuits.

According to another example, the switch module may be switched to connect the antenna with a first matching circuit when the connections of the first external device and the second external device are not detected, may be switched to connect the antenna with a second matching circuit when the connection of the first external device is detected, may be switched to connect the antenna with a third matching circuit when the connection of the second external device is detected, and may be switched to connect the antenna with a fourth matching circuit when the connections of the first and second external devices are detected.

According to some embodiments, the switch module (for example, the switch module 840) may be switched to connect the communication module (for example, the communication module 830) with at least one of a plurality of antennas. For example, the switch module (for example, the switch module 840) may be switched to connect an antenna corresponding to the connected external electronic device with the communication module (for example, the communication module 830).

According to some embodiments, the switch module (for example, the switch module 940) may be switched to connect the communication module (for example, the communication module 930) and the antenna (for example, the antenna 901) with one of a plurality of grounding portions.

According to some embodiments, the switch module (for example, the switch module 1040) may be switched to connect the communication module (for example, the communication module 1030) with one of a plurality of feeding portions.

The processor according to various embodiments of the disclosure (for example, the processor 610, the processor 710, the processor 810, the processor 910, or the processor 1010) may determine whether a change in impedance matching is needed in operation 1105. For example, the processor may determine whether a change in impedance matching is needed on the basis of a communication state. According to some embodiments, the processor may determine whether a change in impedance matching is needed on the basis of a function or a sensor that is being used.

When it is determined that a change in impedance matching is not needed in operation 1105, the processor may proceed to operation 1109.

When it is determined that a change in impedance matching is needed in operation 1105, the processor may perform switching such that the antenna is connected to one of a plurality of matching circuits on the basis of at least a portion of at least one connected external device and a communication state. For example, the processor may control the switch module to connect the antenna with one of the plurality of matching circuits according to a current communication frequency band. In some embodiments, the processor may control the switch module to connect the antenna with one of the plurality of matching circuits according to a currently used function or a currently used sensor. According to some embodiments, the processor may control the switch module to connect the communication module and one of the plurality of antennas on the basis of at least a portion of at least one connected external device and a communication state.

At least one detection circuit according to various embodiments of the disclosure may determine whether the connections of all external devices are released in operation 1109.

When the connections of all external devices are not released in operation 1109, for example, when the connection of some external devices are released or when the previous connection is maintained in operation 1109, the switch module may return to operation 1103 and repeat the above-described operations. For example, the switch module may be switched to connect the antenna with a matching circuit corresponding to the currently connected external device among the plurality of matching circuits, and the processor may perform an operation for determining whether a change in impedance matching is needed.

When the connections of all external devices are released in operation 1109, the switch module may be switched to the default state in operation 1111. The at least one detection circuit may supply a high signal to at least one control terminal of the switch module.

A method of matching impedance of an antenna by an electronic device according to various embodiments of the disclosure may include an operation of detecting a connection between each of at least one external device and the at least one interface by at least one detection circuit and an operation of performing switching to connect the antenna with a matching circuit corresponding to the at least one connected external device among at least two matching circuits in response to the detection of the connection of the at least one external device by the switch module.

According to various embodiments, the operation of detecting the connection of the at least one external device may include at least one of a first detection operation of detecting whether a first external device is connected to a first interface and a second detection operation of detecting whether a second external device is connected to a second interface, and the operation of performing the switching may include an operation of performing switching to connect the antenna with a first matching circuit when no connection of the first external device and the second external device is detected, an operation of performing switching to connect the antenna with a second matching circuit when the connection of the first external device is detected, an operation of performing switching to connect the antenna, and an operation of performing switching to connect the antenna with a fourth matching circuit when the connections of the first and second external devices are detected.

According to various embodiments, the method may further include an operation of determining, by a processor, whether a change in impedance is needed based on a current communication frequency band, wherein the operation of performing the switching may include an operation of performing switching to connect the antenna with one of the at least two matching circuits based at least partially on the connection of the external device and the communication frequency band.

The term "module", as used herein, can imply a unit including hardware, software, and firmware, or any suitable combination. The term "module" can be interchangeably used with terms such as "unit", "logic", "logical block", "component", "circuit", and the like. A module can be a minimum unit of an integral component or can be a part thereof. A module can be a minimum unit for performing one or more functions or may be a part thereof. A module can be mechanically or electrically implemented. For example, a module, according to an embodiment of the present disclosure, can include at least one of an Application-Specific Integrated Circuit (ASIC) chip, a Field-Programmable Gate Arrays (FPGAs), and a programmable-logic device, which are known or will be developed and which perform certain operations.

At least some parts of a device (e.g., modules or functions thereof) or a method (e.g., operations), based on embodiments of the present disclosure, can be implemented with an instruction stored in a non-transitory computer-readable storage medium (e.g., the memory 130, the memory 230, the memory 420, the memory 520, the memory 620, the memory 720, the memory 820, the memory 920, the memory 1020) as a program module. When the instruction is executed by a processor (e.g., the processor 120, the processor 210, the processor 410, the processor 510, the processor 610, the processor 710, the processor 810, the processor 910, the processor 1010), the processor can perform a function corresponding to the instruction.

The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter.

The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

The embodiments disclosed in the specification and drawings merely present specific examples to easily explain details of the present invention and to ease the understanding, and do not limit the range of the present invention. Therefore, the scope of the present invention should be construed as encompassing all modifications or modified forms derived based on the technical idea of the present invention as well as the disclosed embodiments.

The invention claimed is:

1. An electronic device comprising:
at least one interface;
at least one detection circuit configured to detect a connection between each of at least one external device and the at least one interface;
at least two matching circuits;
an antenna; and
a switch module configured to receive at least one signal corresponding to the connection or non-connection between the at least one external device and the at least one interface from the at least one detection circuit and connect the antenna with a matching circuit corresponding to the at least one signal among the at least two matching circuits,
wherein the at least one interface comprises a first interface and a second interface,
the at least one detection circuit comprises a first detection circuit configured to detect whether a first external device is connected to the first interface and a second detection circuit configured to detect whether a second external device is connected to the second interface, and
the at least two matching circuits comprise a first matching circuit connected to the antenna when there is no connection of the first external device and the second external device, a second matching circuit connected to the antenna when the first external device is connected, a third matching circuit connected to the antenna when the second external device is connected, and a fourth matching circuit connected to the antenna when the first and second external devices are connected.

2. The electronic device of claim 1, wherein the at least two matching circuits comprise at least one of:
at least one of a resistor, a capacitor, and an inductor connected in at least one of series and parallel; or
at least two grounding portions located at different locations.

3. The electronic device of claim 1, further comprising a processor configured to receive the at least one signal from the at least one detection circuit,
wherein the processor transmits at least one control signal to the switch module based at least partially on a communication frequency band of the electronic device, and
the switch module is switched to connect the antenna with one of the at least two matching circuits based at least partially on the at least one signal and the at least one control signal.

4. The electronic device of claim 3, wherein the processor is configured to transmit the at least one control signal to the switch module based at least partially on a change in impedance of the antenna or in a resonant frequency in the communication frequency band due to the connection of the at least one external device.

5. The electronic device of claim 4, wherein the processor transmits a first control signal to the switch module when the communication frequency band is a band in which the impedance of the antenna or the resonant frequency is changed to a value smaller than a predetermined size during the connection of the at least one external device and transmits a second signal to the switch module when the communication frequency band is a band in which the impedance of the antenna or the resonant frequency is changed to a value larger than or equal to the predetermined size.

6. The electronic device of claim 4, further comprising a memory configured to store a mapping table in which a plurality of communication frequency bands and the at least one control signal are mapped.

7. The electronic device of claim 1, wherein the at least two matching circuits comprise at least one of:
at least two feeding portions located at different locations; or
at least two grounding portions located at different locations.

8. The electronic device of claim 1, wherein the at least one interface comprises an audio interface, a micro Universal Serial Bus (USB) interface, or a USB type-C interface.

9. The electronic device of claim 1, wherein the at least one interface is located adjacent to the antenna.

10. An electronic device comprising:
at least one interface;
at least one detection circuit configured to detect each of at least one external device connected to the at least one interface;
a communication module;
at least two antennas; and
a switch module configured to receive at least one signal corresponding to a connection or non-connection between the at least one external device and the at least one interface from the at least one detection circuit and connect the communication module with an antenna corresponding to the at least one signal among the at least two antennas,
wherein the at least one interface comprises a first interface and a second interface,
the at least one detection circuit comprises a first detection circuit configured to detect whether a first external device is connected to the first interface and a second detection circuit configured to detect whether a second external device is connected to the second interface, and
the at least two antennas comprise a first antenna connected to the communication module when there is no connection of the first external device and the second external device, a second antenna connected to the communication module when the first external device is connected, a third antenna connected to the communication module when the second external device is connected, and a fourth antenna connected to the communication module when the first and second external devices are connected.

11. The electronic device of claim 10, further comprising a processor configured to receive the at least one signal from the at least one detection circuit,
wherein the processor transmits at least one control signal to the switch module based at least partially on a communication frequency band of the electronic device, and
the switch module is switched to connect one of the at least two antennas with the communication module based at least partially on the at least one signal and the at least one control signal.

12. The electronic device of claim 11, wherein the processor is configured to transmit the at least one control signal to the switch module based at least partially on a change in impedance of the antenna or in a resonant frequency in the communication frequency band due to the connection of the at least one external device.

13. The electronic device of claim 12, wherein the processor transmits a first control signal to the switch module when the communication frequency band is a band in which the impedance of the antenna or the resonant frequency is changed to a value smaller than a predetermined size during the connection of the at least one external device and transmits a second signal to the switch module when the communication frequency band is a band in which the impedance of the antenna or the resonant frequency is changed to a value larger than or equal to the predetermined size.

14. The electronic device of claim 10, wherein the at least one interface comprises an audio interface, a micro Universal Serial Bus (USB) interface, or a USB type-C interface.

15. The electronic device of claim 12, further comprising:
a memory configured to store a mapping table in which communication frequency bands supported by the antenna and the at least one control signal are mapped.

16. A method of matching impedance of an antenna by an electronic device, the method comprising:
detecting, by at least one detection circuit, a connection between each of at least one external device and the at least one interface; and
performing, by a switch module, switching to connect the antenna with a matching circuit corresponding to the at least one connected external device among at least two matching circuits in response to the detection of the connection of the at least one external device,
wherein the detecting of the connection of the at least one external device comprises at least one of:
a first detection operation of detecting whether a first external device is connected to a first interface; and
a second detection operation of detecting whether a second external device is connected to a second interface, and
the performing of the switching comprises:
performing switching to connect the antenna with a first matching circuit when no connection of the first external device and the second external device is detected;
performing switching to connect the antenna with a second matching circuit when the connection of the first external device is detected;
performing switching to connect the antenna with a third matching circuit when the connection of the second external device is detected; and
performing switching to connect the antenna with a fourth matching circuit when the connections of the first and second external devices are detected.

17. The method of claim 16, further comprising determining whether a change in impedance is needed based on a current communication frequency band by a processor, wherein the performing of the switching comprises performing switching to connect the antenna with one of the at least two matching circuits based at least partially on the connection of the external device and the communication frequency band.

* * * * *